United States Patent
Okazaki et al.

(10) Patent No.: US 12,227,365 B2
(45) Date of Patent: Feb. 18, 2025

(54) CONVEYANCE DEVICE

(71) Applicant: KYOTO SEISAKUSHO CO., LTD., Kyoto (JP)

(72) Inventors: Yoshiyuki Okazaki, Kyoto (JP); Ryota Omichi, Kyoto (JP)

(73) Assignee: KYOTO SEISAKUSHO CO., LTD., Kyoto (JP)

( * ) Notice: Subject to any disclaimer, the term of this patent is extended or adjusted under 35 U.S.C. 154(b) by 105 days.

(21) Appl. No.: 18/017,085

(22) PCT Filed: Mar. 25, 2021

(86) PCT No.: PCT/JP2021/012617
§ 371 (c)(1),
(2) Date: Jan. 20, 2023

(87) PCT Pub. No.: WO2022/024457
PCT Pub. Date: Feb. 3, 2022

(65) Prior Publication Data
US 2023/0294929 A1    Sep. 21, 2023

(30) Foreign Application Priority Data
Jul. 30, 2020  (JP) .................................. 2020-128904

(51) Int. Cl.
*B31B 50/00* (2017.01)
*B65G 17/32* (2006.01)
*B65G 35/06* (2006.01)

(52) U.S. Cl.
CPC ............ *B65G 35/06* (2013.01); *B31B 50/004* (2017.08); *B65G 17/323* (2013.01); *B65G 2207/08* (2013.01)

(58) Field of Classification Search
CPC ...... B31B 50/004; B65G 54/02; B65G 35/06; B65G 2207/08; B65G 17/323;
(Continued)

(56) References Cited

U.S. PATENT DOCUMENTS 4,823,934 A  *  4/1989  Lemaire ............... B65G 17/323
                                                198/470.1
9,604,795 B2 *  3/2017  Aumann ................ B65G 54/02
(Continued)

FOREIGN PATENT DOCUMENTS

CN       107000865 A  *  8/2017  ............. B65B 41/02
EP        3521219 A1 *  8/2019  ............. B65G 54/02
(Continued)

OTHER PUBLICATIONS

International Search Report and Written Opinion mailed on May 18, 2021, received for PCT Application PCT/JP2021/012617, filed on Mar. 25, 2021, 10 pages including English Translation.

*Primary Examiner* — Gene O Crawford
*Assistant Examiner* — Muhammad Awais
(74) *Attorney, Agent, or Firm* — XSENSUS LLP

(57) ABSTRACT

A conveyance device 1 that conveys articles, the conveyance device 1 including a circulation path 10 and movable modules 20 that are movable on the circulation path 10. A main container 31 on which an article can be placed and a pair of holding members 311, 312 able to move towards and away from each other are provided to some of the movable modules 20. The article is placed on the main container 31 and conveyed on the circulation path 10 while being held by the pair of holding members 311, 312.

4 Claims, 15 Drawing Sheets

(58) Field of Classification Search
CPC .. B65G 47/847; B65G 21/20; B65G 21/2018; B65B 7/16; B65B 35/24; B65B 43/46; B65B 35/16
USPC .......................................... 198/803.7, 836.1
See application file for complete search history.

(56) References Cited

U.S. PATENT DOCUMENTS

| | | | |
|---|---|---|---|
| 10,196,164 B2* | 2/2019 | Nakamoto | B65G 47/842 |
| 2008/0219825 A1* | 9/2008 | Yoshida | B65G 47/61 |
| | | | 414/749.6 |
| 2015/0158611 A1* | 6/2015 | Kalany | B65G 47/26 |
| | | | 53/531 |

FOREIGN PATENT DOCUMENTS

| | | | | |
|---|---|---|---|---|
| ES | 2725300 A1 * | 9/2019 | ............. | B25J 9/003 |
| JP | 2011201672 A * | 10/2011 | | |
| JP | 2019119588 A * | 7/2019 | | |
| WO | 2013/189656 A1 | 12/2013 | | |
| WO | WO-2020126218 A1 * | 6/2020 | ........... | B65G 47/842 |

* cited by examiner

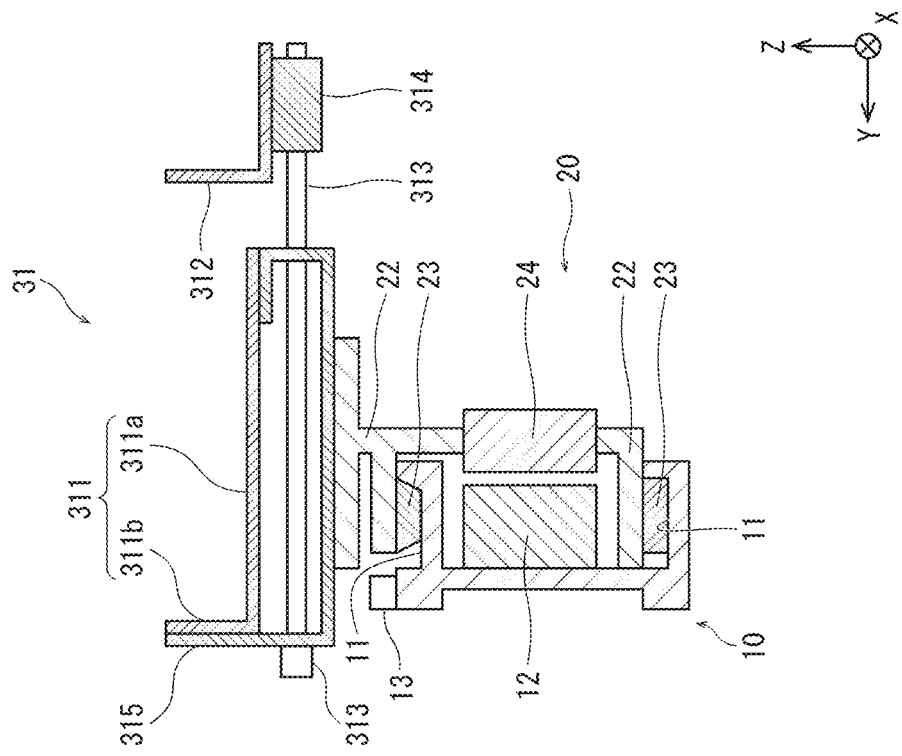
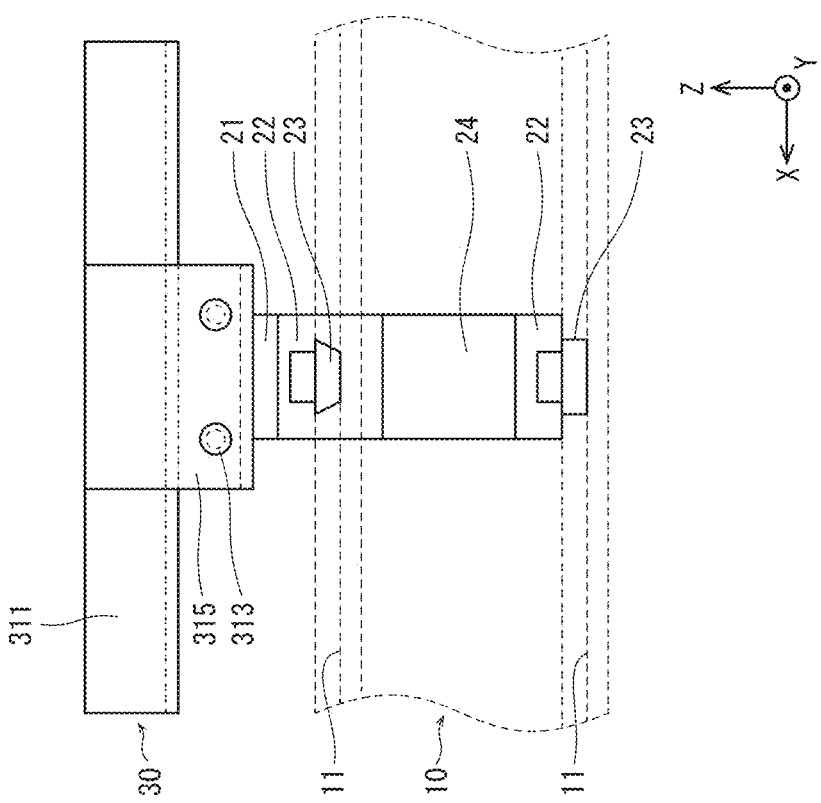

CONVEYANCE DEVICE

CROSS-REFERENCE TO RELATED APPLICATIONS

The present application is 371 of PCT filing PCT/JP2021/012617, filed Mar. 25, 2021, which claims priority to JP 2020-128904, filed Jul. 30, 2020, the entire contents of each are incorporated herein by reference.

TECHNICAL FIELD

The present disclosure relates to conveyance devices, and in particular to conveyance devices that convey articles by linear conveyance methods.

BACKGROUND ART

In recent years, in production lines and the like, linear conveyance methods in which multiple containers loaded with articles are conveyed by a linear motor are being used in conveyance devices for conveying articles such as products, parts, manufactured articles, packages, containers, and the like (for example, see Patent Literature 1).

CITATION LIST

Patent Literature

[Patent Literature 1] JP 2019-119588 A
[Patent Literature 2] WO 2013/189656

SUMMARY OF INVENTION

Technical Problem

However, in the conventional conveyance device described in Patent Literature 1, an article is placed in a container and conveyed, and therefore when the article to be conveyed is changed to an article of a different size, for example, work is required to change multiple containers on the conveyance path to suit the articles of different size, and thus a lot of work time is required for changes in article size.

The present disclosure is made in view of the problems described above, and an object of the present disclosure is to provide a conveyance device able to convey articles of different sizes without requiring changes in container types due to changes in size of articles to be conveyed.

Solution to Problem

The conveyance device that is an aspect of the present disclosure conveys articles and includes a circulation path and movable modules that are movable on the circulation path, wherein a main container on which an article can be placed and a pair of holding members able to move towards and away from each other are provided to at least one of the movable modules, and the article is placed on the main container and conveyed on the circulation path while being held by the pair of holding members.

Advantageous Effects of Invention

According to the conveyance device pertaining to this aspect of the present disclosure, a conveyance device is provided that is able to convey articles of different sizes by pressure holding without requiring changes in container types due to changes in size of articles to be conveyed.

BRIEF DESCRIPTION OF DRAWINGS

FIG. 4A is a view in the direction of arrow A in FIG. 1, and FIG. 4B is a cross-section view in the direction of arrows B-B in FIG. 1.

DESCRIPTION OF EMBODIMENTS

<<Circumstances Leading to an Embodiment>>

Figure 1:
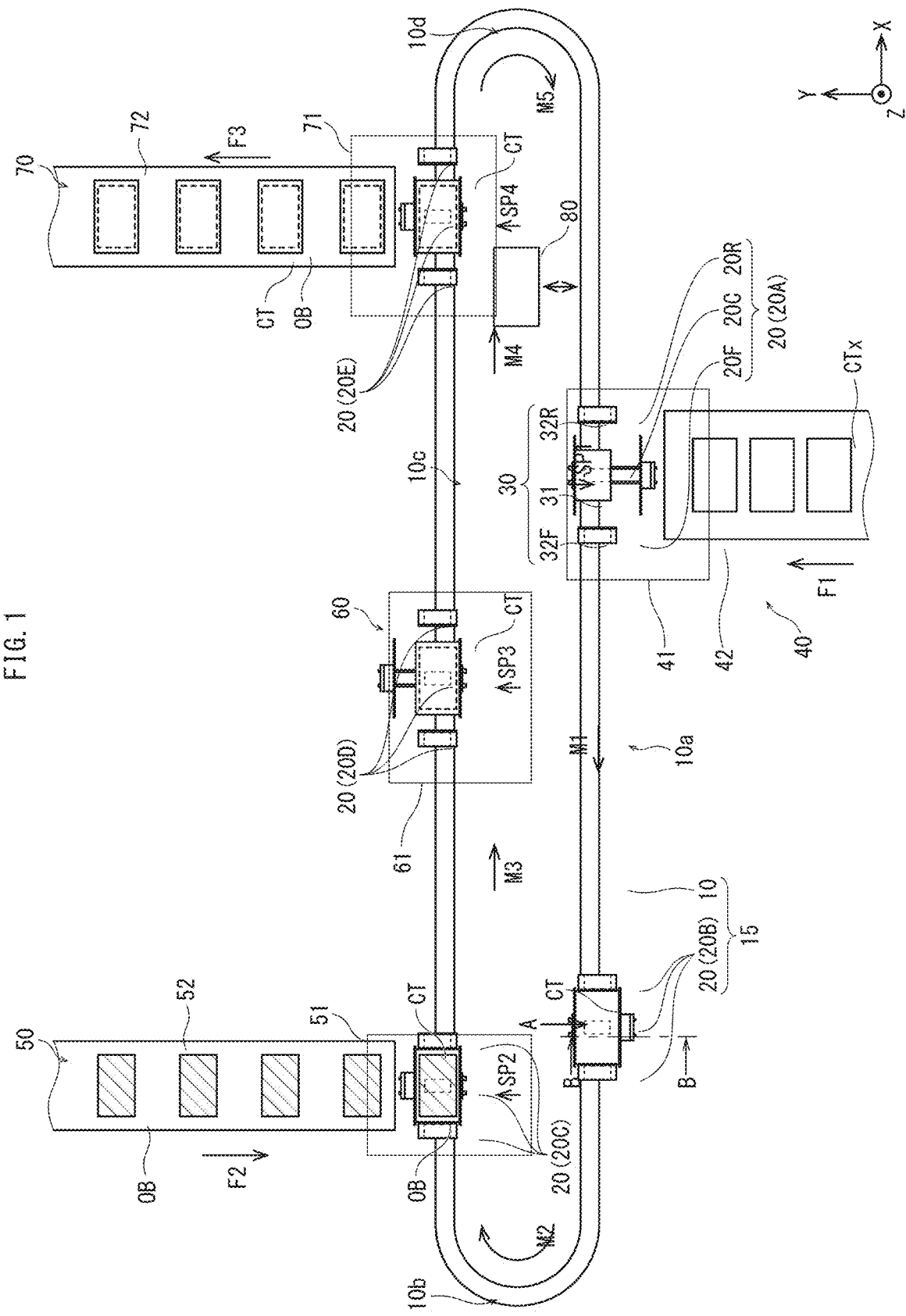
FIG. 1 is a plan view diagram illustrating structure of a conveyance device 1 according to an embodiment.

In recent years, multi-product production has become widespread, in which products of different sizes and types are manufactured using a common production line. Further, recently, in order to reduce pre-production and inventory, there is demand for a production system that can achieve timely supply of a desired product in a desired quantity according to a placed order.

Such multi-product production involves changing sizes of articles such as parts and intermediate products conveyed in a production line according to switching of product types to be manufactured. In such cases, in a conventional conveyance device, containers and parts are changed according to article size, and allowable dimensions of containers are adjusted, or in other words, a "format change" of containers is used to deal with article size changes.

However, in such a format change, there are cases where parts need to be changed or adjusted in dozens of places, and such work can take from tens of minutes to several hours, which is an obstacle to improving production efficiency. Further, minute dimension changes during adjustment can affect workmanship of a product (appearance and structure), incorrect adjustment or incorrect installation of parts may lead to equipment damage, and such work requires considerable attention and skill, making for a heavy burden on workers.

On the other hand, for example as in Patent Literature 2, techniques have been proposed using linear conveyance methods without containers, in which pillow packs are transported while stacked and held between front and rear movable elements to accommodate changes in pillow pack amounts. However, according to such a conveyance device, articles are conveyed while held between two movable elements, and therefore there is a concern that it is difficult to convey articles in a circulating path that includes a curved path.

Therefore, the inventors considered that the most effective way to reduce work time and work load associated with format changes is to reduce container format change work that accompanies size changes of articles to be conveyed. With this in mind, the inventors studied device structures that do not require container format changes due to size changes of articles to be conveyed, and arrived at the conveyance device pertaining to the following embodiments.

The following describes the conveyance device pertaining to various embodiments, with reference to the drawings.

Overview of Embodiments

The conveyance device according to an embodiment of the present disclosure conveys articles and includes a circulation path and movable modules that are movable on the circulation path, wherein a main container on which an article can be placed and a pair of holding members able to move towards and away from each other are provided to at least one of the movable modules, and the article is placed on the main container and conveyed on the circulation path while being held by the pair of holding members.

According to this structure, a conveyance device is provided that is able to convey articles of different sizes by pressure holding without requiring changes in container types.

According to at least one embodiment, the pair of holding members able to move towards and away from each other move towards and away from each other in a direction perpendicular to a conveyance direction in which the movable modules move. According to at least one embodiment, the pair of holding members move towards each other by application of pressure from an elastic member.

According to this structure, it is possible for the pair of holding members to press and hold the article in the direction perpendicular to the conveyance direction of the movable modules. As a result, by use of the main container disposed on the movable module, it is possible to convey articles of different sizes and reduce work associated with container format changes that accompanies changes in size of articles to be conveyed.

According to at least one embodiment, the article is a packing box that is semi-finished, when the packing box is transferred to the main container, the holding members move away from each other, and after the packing box is transferred to the main container, the holding members move towards each other and hold the packing box.

According to this structure, transfer of an article to the main container is facilitated, and it is possible to grip and hold the transferred article.

According to at least one embodiment, the movable modules include a group of a first movable module provided with the main container, a second movable module positioned before the first movable module in a movement direction on the circulation path, and a third movable module positioned after the first movable module in the movement direction, the group moving together on the circulation path, the second movable module and the third movable module are each provided with a guide container able to hold a respective side of the article placed on the main container, the guide container of the second movable module supporting the article from the front in the movement direction, and the guide container of the third movable module supporting the article from the rear in the movement direction, and the article is conveyed by the group of the movable modules as a conveyance unit.

According to this structure, in the conveyance device, elements constituting the container set, that is, the main container on which the article is placed and the two guide containers that support the article from the front and rear in the movement direction, are mounted on one group of three consecutive movable modules that move together on the circulation path.

Accordingly, when changing size of an article to be conveyed, the change in size can be easily accommodated simply by changing a distance between movable modules to change a distance between the guide containers. Thus, a conveyance device is provided that is able to convey articles of different sizes, reducing format change work that is conventionally required of exchanging a plurality of containers on a circulation path for containers suitable for articles of a new size.

Further, weight of the article is held by the main container and the article is supported by guide containers from the front and rear in the movement direction, and therefore it is possible to convey articles on curved paths, which was difficult with conventional systems.

According to at least one embodiment, when the second movable module moves on a curve on the circulation path, a distance between the second movable module and the fast movable module is greater than that when moving in a straight line on the circulation path, and when the third movable module moves on a curve on the circulation path, a distance between the third movable module and the first movable module is greater than that when moving in a straight line on the circulation path.

According to this structure, when moving along a curved path portion of the circulation path, distance between the two guide containers is increased in advance over that of linear conveyance, thereby avoiding collision between the guide containers and the article due to a distance between the two guide containers narrowing along the inner diameter of the curved portion.

According to at least one embodiment, the article is a packing box having a box portion and a lid portion extending from an open edge of the box portion, the conveyance device further comprises a sealing device that, when the packing box has been filled with a product and conveyed on the circulation path, seals the packing box by closing the lid of the packing box, bending flaps of the lid portion, and adhering the box portion to the flaps of the lid portion, and after the sealing, while the first movable module is moving in a straight line on the circulation path, the guide containers provided to the second movable module and the third movable module press against front and rear flaps of the lid portion of the packing box from the front and rear, respectively, and conduct pressure-fixing, fixing the flaps to the box portion.

According to this structure, after the sealing process, the lid can be pressure-fixed to the side surfaces of the packing box while the packing box is conveyed in a straight line, which reduces waiting time conventionally required for pressure-fixing after sealing.

According to at least one embodiment, the article is a packing box that is semi-finished, and the conveyance device further comprises a box-making device that forms the semi-finished packing box by bending portions of a sheet-like packing member that are to be ridge lines, and transfers the semi-finished packing box onto the main container.

According to this structure, a compact device is realized that is able to perform a continuous process in which a semi-finished packing box is formed from a sheet-like packing member, transferred to the main container, and, while being conveyed on the circulation path, filled with a product and sealed.

EMBODIMENTS

The following describes structure of conveyance device 1 according to an embodiment, with reference to the drawings. In this description, the X direction, Y direction, and Z direction in each drawing may be referred to as a width direction, depth direction, and height direction, respectively, while a positive height direction may be referred to as an "upwards" direction and a negative height direction as a "downwards" direction. Further, elements in each drawing are not necessarily drawn to scale. Further, in this description, a numerical range indicated by the symbol "-" includes values at both ends of the numerical range. Further, materials, numerical values, and the like described herein are only preferred examples, and are not limiting. Further, appropriate modifications are possible without departing from the scope of the technical ideas of the present disclosure. Further, partial combinations of structures of other embodiments are possible within any range that does not cause contradiction.

<Structure of Conveyance Device 1>

The following describes structure of conveyance device 1, with reference to the drawings. FIG. 1 is a plan view diagram illustrating structure of the conveyance device 1 according to an embodiment (Overall Structure)

The conveyance device 1 is a conveyance device that conveys articles by a linear conveyance system. The conveyance device 1 uses a linear conveyor 15 that independently controls conveyance of each plurality of movable modules 20 on a circulation path 10 using a linear motor. Further, in the present embodiment, as aspect of the conveyance device 1 is described using a packing box CT as an example of an article to be conveyed. However, an article to be conveyed may be, for example, a container of various products, a product, a part, or the like, other than the packing box CT.

The conveyance device 1 includes, as illustrated in FIG. 1, a linear conveyor 15 having the circulation path 10 and a plurality of the movable modules 20, container sets 30, and a controller 80. Further, the circulation path 10 is provided with a box-making unit 40, a product filling unit 50, a sealing unit 60, and a transfer unit 70 a different positions SP1, SP2, SP3, and SP4, respectively, on the circulation path 10.

According to these structures, in the conveyance device 1 pertaining to an embodiment, an operation is performed in which a packing box CT is formed from a packing member CTx supplied by the box-making unit 40, the packing box CT is conveyed along the circulation path 10, the packing box CT is filled with a product OB by the product filling unit 50, the packing box CT is sealed by the sealing unit 60, and the packing box CT containing the product OB is transferred off the circulation path 10 by the transfer unit 70.

(Structures of Units)

The following describes structures of units of the conveyance device 1.

[Circulation Path 10, Movable Modules 20, Container Sets 30]

The circulation path 10 is a loop-shaped circulation path including stators of linear motors. As illustrated in FIG. 1, the circulation path 10 functions as a guide for moving the container sets 30, and in plan view has an oval layout including linear path portions 10a and 10c and curved path portions 10b and 10d.

Each of the movable modules 20 includes a movable element of a linear motor that can move on the circulation path 10. A plurality of the movable modules 20 is a group of three consecutive movable modules 20 on the circulation path 10. In this example, as illustrated in FIG. 1, the movable modules 20 are grouped into groups 20A, 20B, 20C, 20D, 20E (which hereinafter may each be referred to as a group 20X). The movable modules 20 move on the circulation path 10 in group units, and the packing boxes CT are conveyed by the groups 20A-20E of the movable modules 20 in conveyance units (where a unit is one in the present example).

A group 20X of the movable modules 20 includes three movable modules 20F, 20C, 20R that are consecutive in a movement direction around the circulation path 10, and are controlled to move on the circulation path 10 with mutual spacing along the movement direction (M1-M5). In this description, the movable modules 20 belonging to the same group are referred to, in order from the front in the movement direction, as a second movable module 20F, a first movable module 20C, and a third movable module 20R.

Figure 2A:
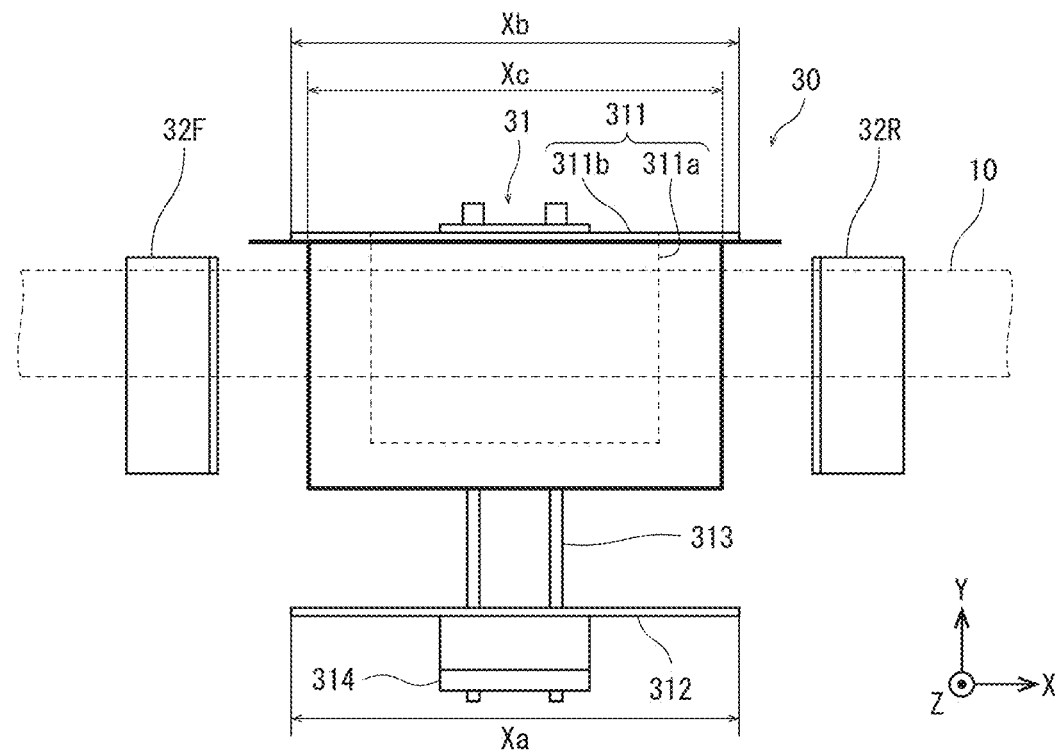
FIG. 2A is a plan view diagram of a group of movable modules 20 corresponding to a container set 30 on which a packing box CT is mounted.
Figure 2B:
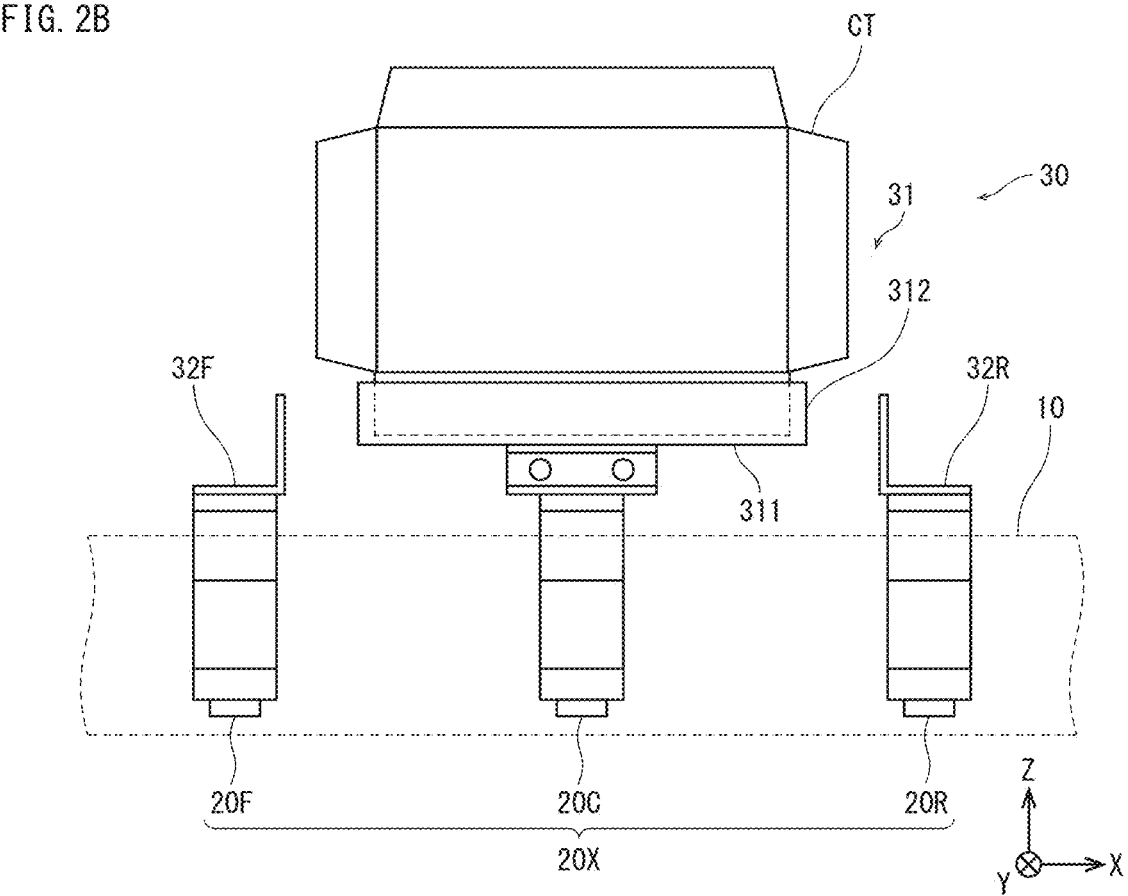
FIG. 2B is a corresponding frontal view.
Figure 3:
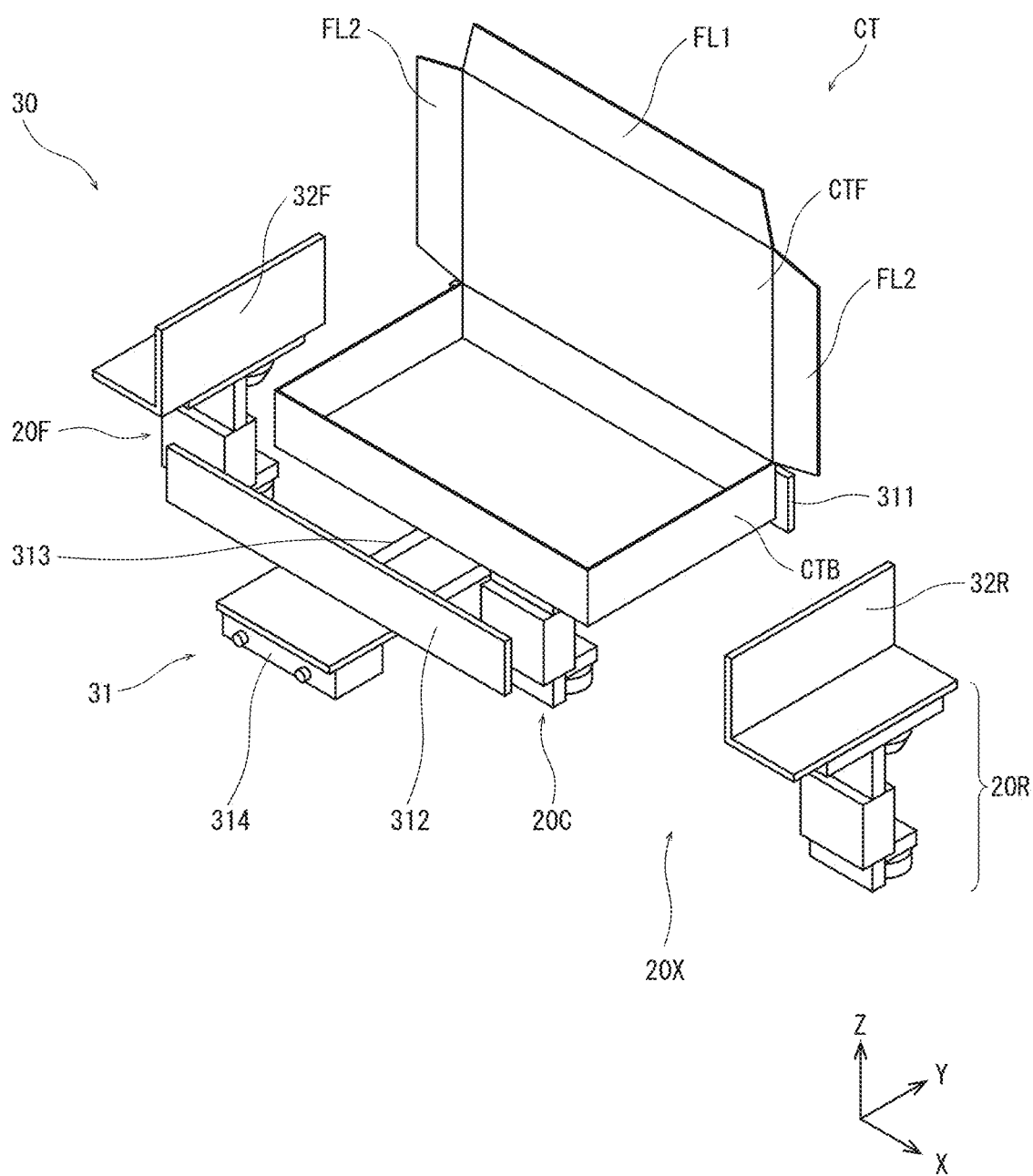
FIG. 3 is a perspective view diagram of a group of movable modules 20 corresponding to a container set 30 on which a packing box CT is mounted.

The container sets 30 are carriers for appropriately holding and conveying packing boxes CT that are mounted on each set, there being one set for each group 20X of the movable modules 20. FIG. 2A is a plan view diagram of a group 20X of the movable modules 20 corresponding to one of the container sets 30 on which a packing box CT is mounted, FIG. 2B is a corresponding frontal view, and FIG. 3 is a perspective view diagram.

The packing box CT is a rectangular cuboid, and is conveyed such that the longitudinal direction is the movement direction. The packing box CT is made of cardboard, for example, and includes a box portion CTB and a lid portion CTF extending from one edge of an opening edge of the box portion CTB. The box portion CTB is manufactured such that a portion of a side surface overlaps on a side surface perpendicular to the longitudinal direction and the overlapping portion is adhesively fixed. The lid portion CTF has a flap FL1 on a longitudinal peripheral edge and flaps FL2 on peripheral edges perpendicular to the longitudinal direction. The packing box CT is sealed by adhesively fixing the flaps FL1 and FL2 to side surfaces of the box portion CTB.

Each of the container sets 30 is composed of a main container 21 arranged on the movable module 20C, a guide container 32F arranged on the movable module 20F, and a guide container 32R arranged on the movable module 20R.

The main container 31 supports weight of the packing box CT and has a shape that allows the packing box CT to be placed thereon. Further, the main container 31 supports from below a center of gravity of an article in order to accommodate packing boxes CT and articles of different sizes, and has a size and shape that allows articles to be placed even in large packing boxes CT.

The guide container 32F and the guide container 32R include L-shaped guide members, and are arranged in front and rear of the main container 31 in the movement direction. The L-shaped guide members are configured to press side surfaces of the packing box CT placed on the main container 31, in order to support the packing box CT. Width of the L-shaped guide members in the direction perpendicular to the conveyance direction is preferably narrower than width of the packing box CT in the same direction. As a result, collision with main container 31, described later, can be avoided, and the packing box CT can be sufficiently pressed.

Further, the guide container 32F and the guide container 32R may be configured to be rotatable about rotation axes parallel to the Z direction relative to the movable module 20F and the movable module 20R, respectively. As a result, when the container set 30 moves along the curved path portion 10b of the circulation path 10, for example, the guide container 32F and the guide container 32R can easily follow side surfaces of the packing box CT to more uniformly press across the side surfaces of the packing box CT.

The main container 31, the guide container 32F, and the guide container 32R are configured to be movable on the circulation path 10 together with the movable module 20C, the movable module 20F, and the movable module 20R, respectively, and control is executed such that the main container 31, the guide container 32F, and the guide container 32R form one group and move together. That is, the movable modules 20F, 20C, 20R have the main container 31, the guide container 32F, and the guide container 32R mounted on their respective top surfaces, and appear to move along the circulation path 10 as one, as each of the container sets 30 is conveyed along the circulation path 10.

As described above, in the conveyance device 1, the elements constituting each of the container sets 30, that is, the main container 31 on which the packing box CT is mounted, the guide container 32F supporting the packing box CT from the front, and the guide container 32R supporting the packing box CT from the rear, are mounted on the movable modules 20F, 20C, 20R, respectively, which move as one group along the circulation path 10, to achieve coordinated movement on the circulation path 10.

According to this structure, when an article to be conveyed is changed to an article of a different size, spacing between the movable modules 20F, 20C, 20R can be changed by the controller 80, for example, changing spacing between the guide container 32F and the guide container 32R, thereby easily accommodating the change in article size. Thus, a conveyance device is provided that is capable of conveying articles of different sizes and reducing format change work conventionally required of exchanging a plurality of containers on a circulation path for containers suitable for articles of a new size.

Further, weight of the packing box CT is held by the main container 31 and the packing box CT is supported by the guide containers 32F, 32R from the front and rear in the movement direction, and therefore an article can be conveyed on a curved route, which is difficult for a structure that holds an article with two movable elements, as conventionally.

Further, when moving along the curved path portion 10b of the circulation path 10, distance between the guide containers 32F, 32R is increased in advance compared to that during linear conveyance, such that collision between the guide containers 32F, 32R and the packing box CT caused by front-to-rear spacing narrowing in the radially inner direction of the curved path portion 10b is avoided.

[Box-Making Unit 40, Product Filling Unit 50, Sealing Unit 60, Transfer Unit 70]

The box-making unit 40 is a mechanical unit that forms a packing box CT from a supplied packing member CTx and transfers a boxed packing box CT to the circulation path 10. As an example, a packing member CTx is made of corrugated cardboard expanded into a sheet called a wrap round, and the box-making unit 40 includes a transfer means 42 that conveys in (F1) a packing member CTx and a box-making device 41 that assembles a packing box CT from the packing member CTx and transfers the packing box CT onto the main container 31, stopping at a position SP1. The box-making device 41 is composed of an assembling mechanism that applies adhesive to adhesion portions of the packing member CTx and bends ridgeline portions of the packing member CTx to form a box shape. Further, the box-making device 41 applies adhesive to a surface of a flap of the lid of the box.

The product filling unit 50 is a mechanical unit that fills the packing box CT on the circulation path 10 with a product OB. The product filling unit 50 includes, for example, a transfer means 52 that conveys in (F2) an product OB and a product filling device 51 that transfers the product OB to the packing box CT on the main container 31, stopping at a position SP2, thereby filling the packing box CT with the product OB. As the transfer device 71, an actuator such as a robot arm that uses suction to hold the product OB and transfer to the packing box CT may be used.

The sealing unit 60 is a mechanical unit that seals the packing box CT on the circulation path 10. The sealing unit 60 includes a sealing device 61 that closes the lid of the packing box CT on the main container 31 stopped at a position SP3 and adheres the flaps of the lid to the side surfaces of the box. The box-making device 41 may use a sealing mechanism that bends the lid of the packing box CT and presses the flaps of the lid against side surfaces of the box.

The transfer unit 70 is a mechanical unit that transfers the packing box CT containing the product OB off the circulation path 10. The transfer unit 70 includes a transfer device 71 and a transfer means 72. The transfer device transfers the packing box CT containing the product OB on the main container 31 stopped at a position SP4 to the transfer means 72, and the transfer means 72 outputs (F3) the packing box CT. As the transfer device 71, an actuator such as a robot arm that uses suction to hold and transfer the packing box CT may be used.

Further, the transfer means 42, 52, 72 may use belt transmission by rotation of a motor, or may be driven by a linear motor.

The controller 80 is connected to the circulation path 10, the box-making unit 40, the product filling unit 50, the sealing unit 60, and the transfer unit 70, and outputs control signals to cause movement of the movable modules 20 on the circulation path 10 and operations of each unit.

The conveyance device 1 having the above structure forms a packing box CT from a supplied packing member CTx, conveys the packing box CT along the circulation path 10, fills the packing box CT with the product OB, seals the lid of the packing box CT, and transfers the packing box CT containing the product OB off the circulation path 10. According to the conveyance device 1 having this structure, a compact device is realized that is capable of continuously executing a series of processes from forming a packing box to sealing the packing box.

[Detailed Structure of Main Container 31 and Movable Modules 20]

Details of the main container 31 and the movable modules 20 are described below, with reference to the drawings.

FIG. 4A is a view in the direction of arrow A in FIG. 1, and FIG. 4B is a cross-section view in the direction of arrows B-B in FIG. 1.

As illustrated in FIG. 2A, 2B, 3, 4A, 4B, the main container 31 includes a mounting table 311 on which the packing box CT is mounted, a movable guide portion 312, a slide shaft 313 that supports the movable guide portion 312 so as to be slidable in the Y direction, a cam mechanism 314, and a mounting table stay 315 connecting the mounting table 311 to a container holding portion 21 of the movable module 20C.

According to the main container 31, the mounting table 311 is fixed to the container holding portion 21 of the movable module 20C by the mounting table stay 315, and when the longitudinal direction of the packing box CT is aligned with the conveyance direction, a vertical portion 311b holds a side surface of the packing box CT parallel to the longitudinal direction while a flat portion 311a supports weight of the packing box CT. The movable guide portion 312 is configured to be slidable in the Y direction along the slide shaft 313, presses another side surface of the packing box CT parallel to the longitudinal direction by a spring or the like, and is released from pressing the side surface by the cam mechanism 314. In other words, the vertical portion 311b of the mounting table 311 and the movable guide portion 312 form a pair of holding members configured to move relative to each other towards and away from each other in a direction perpendicular to the conveyance direction of the movable module 20C. The packing box CT is mounted on the main container 31 and is configured to be held by the vertical portion 311b of the mounting table 311 and the movable guide portion 312, which are a pair of holding members.

Accordingly, the vertical portion 311b of the mounting table 311 and the movable guide portion 312 are capable of pressing and holding the packing box CT in the direction perpendicular to the conveyance direction of the movable module 20C. As a result, by use of the main container 31 disposed on the movable module 20C, it is possible to convey articles of different sizes and reduce work associated with container format changes that accompanies changes in size of articles to be conveyed.

Here, the conveyance direction (X direction) length Xa of the movable guide portion 312 and the conveyance direction (X direction) length Xb of the vertical portion 311b of the mounting table 311 may be longer than a length Xc of a side surface of the packing box CT parallel to the longitudinal direction (X direction) of the packing box CT. Accordingly, when the flap FL1 of the lid portion CTF is adhesively fixed to the side surface of the packing box CT parallel to the longitudinal direction of the packing box CT, the entire length of the flap FL1 may be pressed by the movable guide portion 312.

As illustrated in FIG. 4B, the circulation path 10 includes a guide rail 11 arranged in a loop, a plurality of electromagnetic coils 12 arranged along a direction in which the guide rail 11 extends, and a linear encoder 13 extending in the direction in which the guide rail 11 extends.

As illustrated in FIG. 4B, the movable module 20 is assembled on the circulation path 10 with a base portion 22 fitted to be movable along the guide rail 11 via cylindrical or truncated conical rollers 23. Further, a permanent magnet 24 is disposed on the movable module 20 at a position facing the electromagnetic coil 12 of the circulation path 10. According to this structure, sequential changes of polarity of the electromagnetic coils 12 disposed along the conveyance direction of the guide rail 11 enable the movable module 20 on which the permanent magnet 24 is mounted to move in the conveyance direction.

The linear encoder 13 provided to the circulation path 10 detects position of the movable module 20 and outputs to the controller 80, described later, and the electromagnetic coils 12 are driven and controlled by the controller 80 based on the output from the linear encoder 13. That is, the controller 80 sequentially detects positions of the movable modules 20 on the circulation path 10 via the linear encoder 13, and independently controls conveyance of each of the movable modules 20 based on position information of the movable modules 20.

<Operations of Conveyance Device 1>

The following describes conveyance operations of the conveyance device 1 of the present embodiment.

Figure 5:
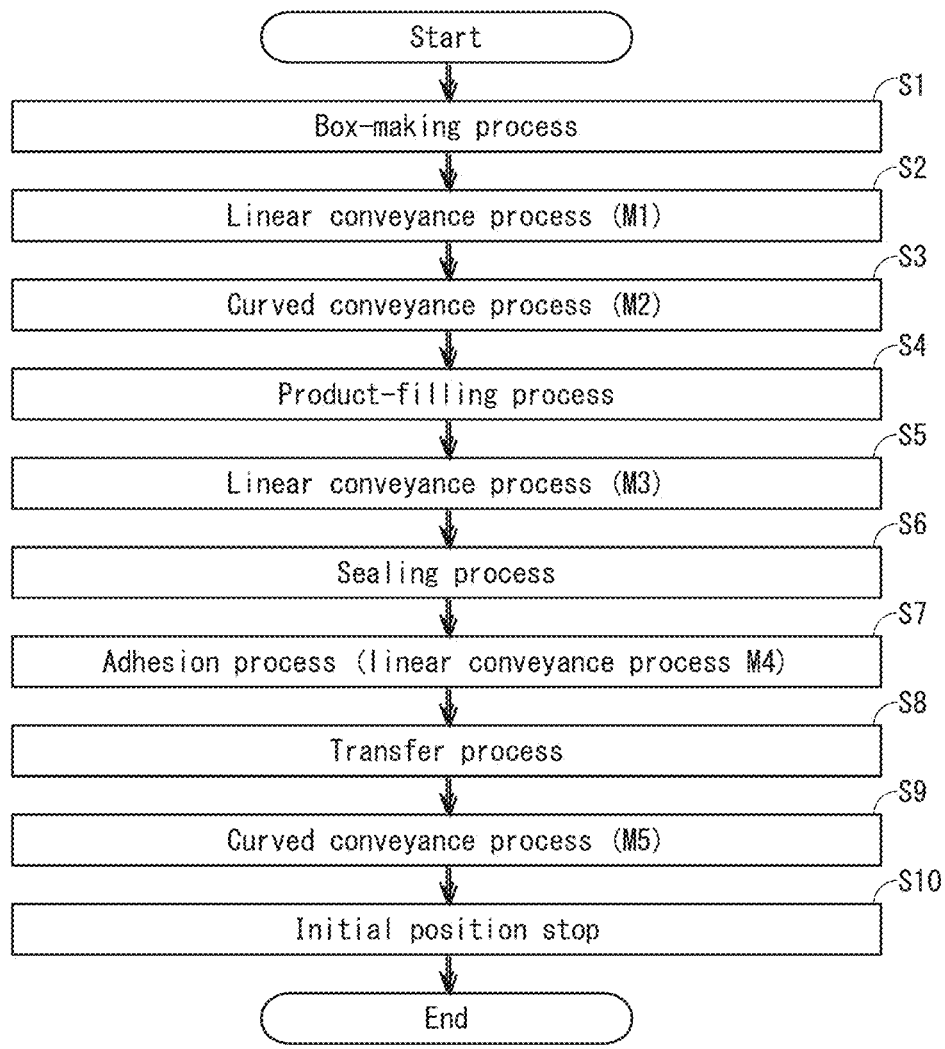
FIG. 5 is a process diagram illustrating one aspect of a conveyance operation, focusing on one group of movable modules 20 in a conveyance device 1.

In the conveyance device 1, the movable modules 20 are grouped into groups of three consecutive movable modules 20 and moved along the circulation path 10. In FIG. 1, groups 20A, 20B, 20C, 20D, 20E of the movable modules 20 are illustrated. FIG. 5 is a process diagram illustrating one aspect of a conveyance operation, focusing on one group of the movable modules 20 in the conveyance device 1.

Operation of the conveyance device 1 is described below, taking the group 20A of the movable modules 20 illustrated in FIG. 1 as an example.

Figure 6A:
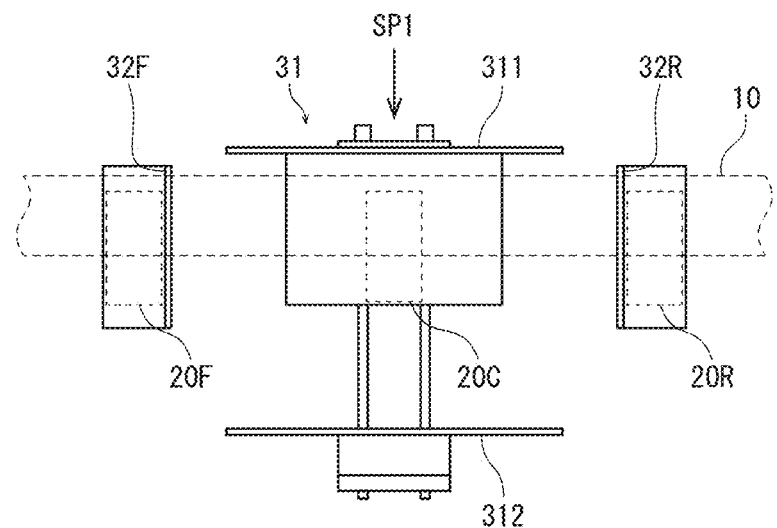
FIG. 6A, 6B, 6C are schematic plan views for illustrating operation of the conveyance device 1 in a box-making process.
Figure 6B:
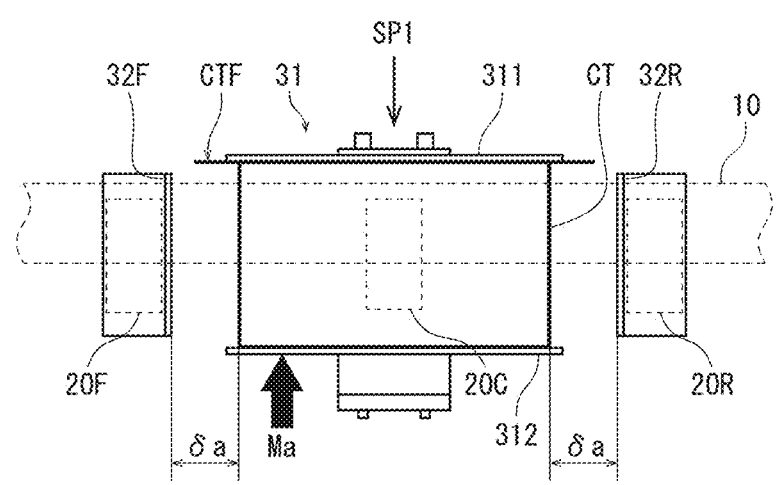
Figure 6C:
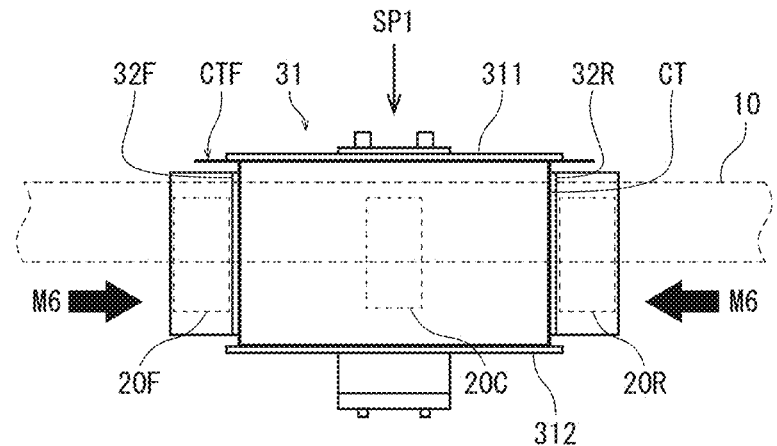

In the operation of the conveyance device 1, first, a box-making process is executed (step S1). FIG. 6A, 6B, 6C are schematic plan view diagrams illustrating operation of the conveyance device 1 in the box-making process, and FIG. 7A, 7B, 7C are schematic frontal view diagrams.

Figure 7A:
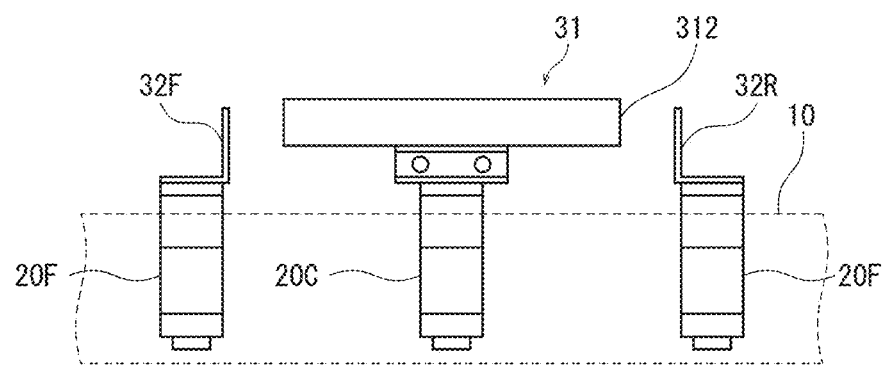
FIG. 7A, 7B, 7C are schematic plan views for illustrating operation of the conveyance device 1 in a box-making process.

In the box-making process, first, the group 20A of the movable modules 20 on which the container set 30 is mounted stops on the circulation path 10 such that a center in the movement direction of the main container 31 is located at the position SP1 on the circulation path 10 (FIG. 6A, 7A). At this time, each of the movable modules 20F, 20C, and 20R stops at a preset position such that the distance between the guide container 32F and the guide container 32R is longer than the length of the packing box CT in the X direction by 2×δa. Here, δa may be in a range from 20 mm to 80 mm.

Further, in order to facilitate placement of the packing box on the main container 31, the vertical portion 311b of the mounting table 311 and the movable guide portion 312 are separated from each other by at least the width of the packing box CT in a direction perpendicular to the conveyance direction of the movable module 20C.

Figure 7B:
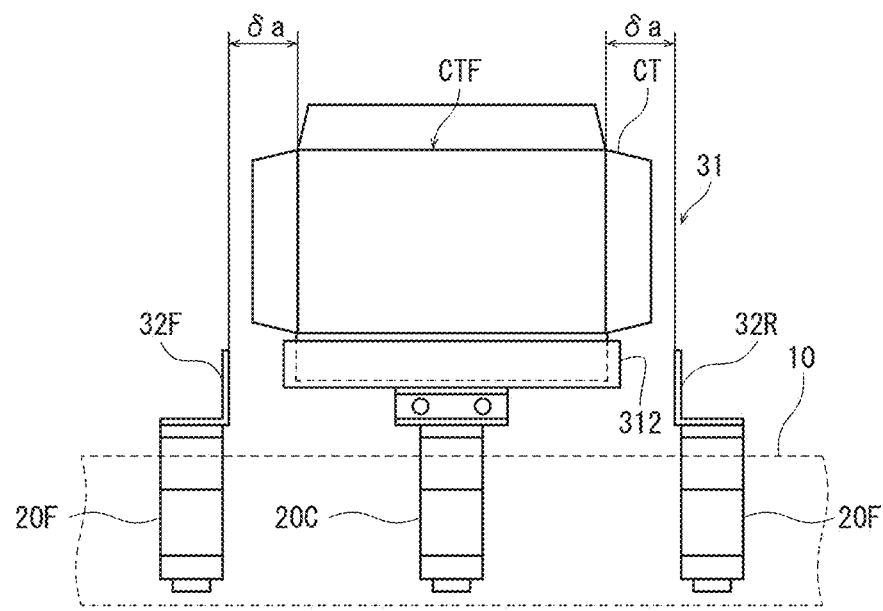
Figure 7C:
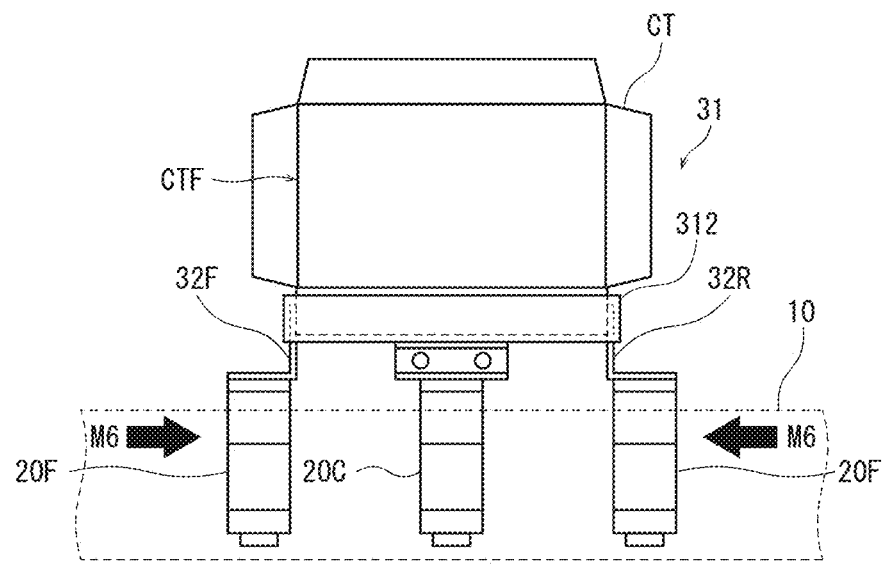

Subsequently, the box-making unit 40 forms the packing box CT from the packing member CTx supplied by the transfer means 42, and places the packing box CT on the mounting table 311 of the main container 31 with the lid opened (FIG. 6B, 7B). Further, after the packing box CT is transferred from the box-making device 41 to the main container 31, the vertical portion 311b of the mounting table 311 and the movable guide portion 312 become closer to each other in the direction perpendicular to the conveyance direction of the movable module 20C (Ma). That is, after the packing box CT is mounted on the main container 31, the packing box CT is held between the vertical portion 311b of the mounting table 311 and the movable guide portion 312.

Accordingly, a structure is realized by which transfer of the packing box CT to the main container 31 is facilitated and the packing box CT after transfer is held and held under pressure.

In the box-making process, the box-making device 41 applies adhesive to adhesion portions of the packing member CTx and bends the sheet-shaped packing member CTx along ridgelines to form a box shape. At this time, the box portion CTB is formed such that portions of the side surfaces perpendicular to the conveyance direction to which adhesive is applied overlap each other, such that overlapping portions are subsequently adhered and fixed. Further, adhesive is applied to surfaces of the flaps FL1, FL2 of the lid portion CTF.

Further, in the transfer, a gap between the guide containers 32F, 32R is set to be longer than the length of the packing box CT in the conveyance direction, in order to facilitate placement of the packing box CT on the main container 31.

Subsequently, after the packing box CT is placed on the main container 31, the movable modules 20F, 20C, 20R become closer to each other until the gap between the guide containers 32F, 32R is equivalent to the length of the packing box CT in the conveyance direction (M6 in FIG. 6C, 7C).

Figure 8A:
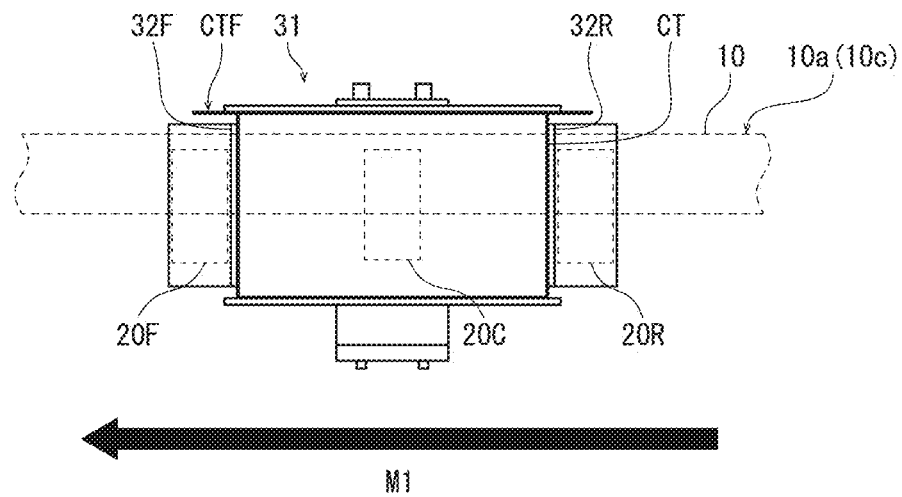
FIG. 8A is a schematic plan view for illustration of operation of the conveyance device 1 in a linear conveyance process.
Figure 8B:
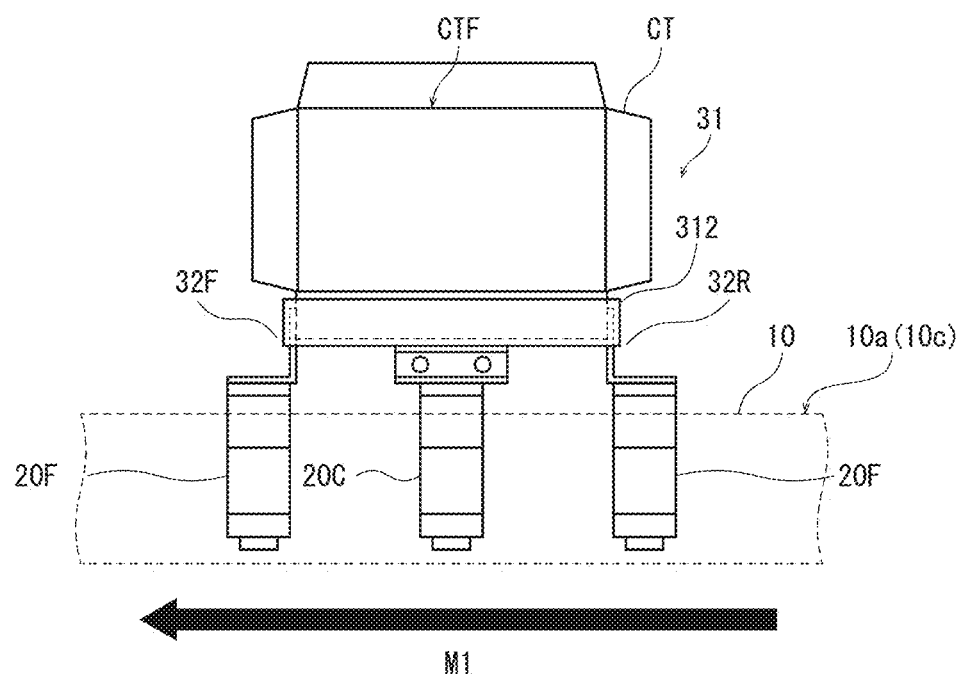
FIG. 8B is a schematic frontal view.

Subsequently, in the linear path portion 10a of the circulation path 10, a linear conveyance process (M1) is performed (step S2). FIG. 8A is a schematic plan view for illustration of operation of the conveyance device 1 in the linear conveyance process, and FIG. 8B is a schematic frontal view.

In the linear conveyance process, the group 20A of the movable modules 20 on which the container set 30 is mounted moves along the linear path portion 10a of the circulation path 10 in a direction M1. At this time, in the linear path portion 10a, pressure is applied portions of side surfaces of box portion CTB perpendicular to the longitudinal direction of the box portion CTB overlapping with adhesion portions, the gap between the guide containers 32F, 32R is maintained to be equivalent to the length of the packing box CT in the conveyance direction, and the group 20A of the movable modules 20 is moved maintaining proximity between the movable modules 20F, 20C, 20R (FIG. 8A, 8B). That is, in the linear conveyance process (M1), the movable module 20F is controlled to travel in front of the movable module 20C by a specified first distance, so that the guide container 32F regulates a forward position of the packing box CT in the movement direction, while the movable module 20R is controlled to travel behind the movable module 20C by a specified second distance, so that the guide container 32R regulates a rear position of the packing box CT in the movement direction. Accordingly, after the box-making process, while the packing box CT is linearly conveyed (M1) on the linear path portion 10a, portions of side surfaces of the box portion CTB perpendicular to the longitudinal direction of the box portion CTB overlapping adhesive portions are pressure-fixed, which reduces waiting time for pressure-fixing that is conventionally required.

Figure 9A:
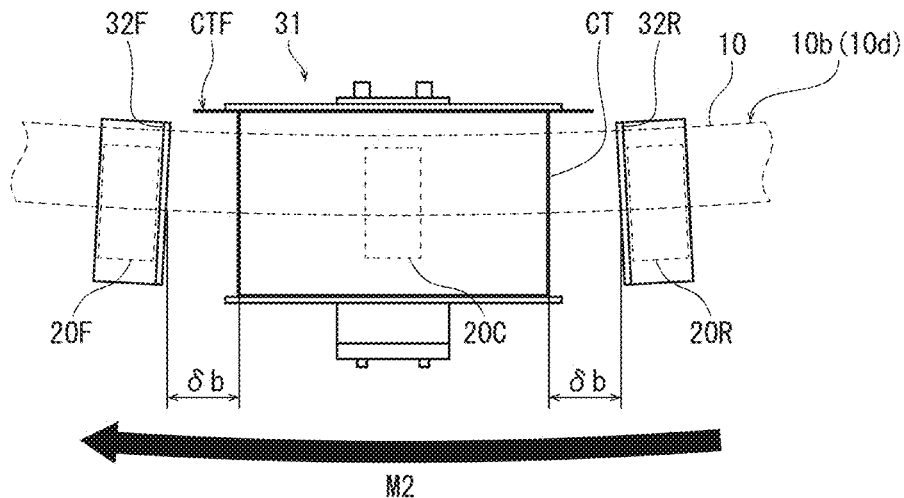
FIG. 9A is a schematic plan view for illustration of operation of the conveyance device 1 in a curved conveyance process.
Figure 9B:
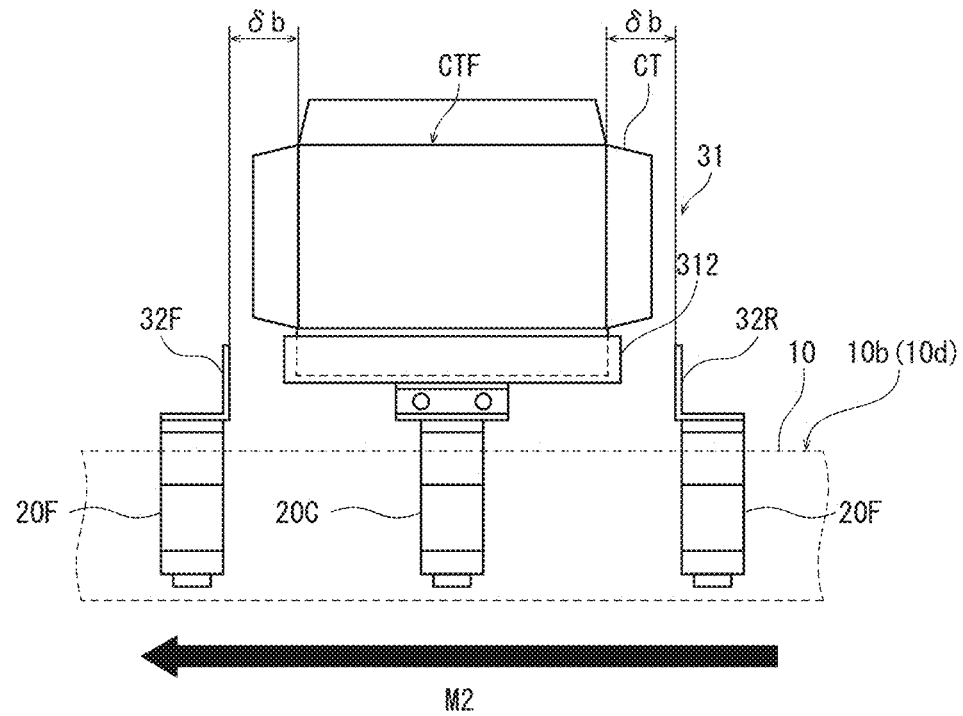
FIG. 9B is a schematic frontal view.

Subsequently, in the curved path portion 10b of the circulation path 10, a curved conveyance process (M2) is performed (step S3). FIG. 9A is a schematic plan view for illustration of operation of the conveyance device 1 in the curved conveyance process, and FIG. 9B is a schematic frontal view.

In the curved conveyance process, the group 20A of the movable modules 20 on which the container set 30 is mounted moves along the curved path portion 10b of the circulation path 10 in a direction M2. At this time, in the curved path portion 10b, distance between the guide containers 32F, 32R and the packing box CT narrows on a radially inwards side of the curved path portion 10b of the circulation path 10 (towards the top of the illustration in FIG. 9A). Therefore, in order to prevent the guide containers 32F, 32R from colliding with the packing box CT, distance between the guide containers 32F, 32R is increased in advance from that of the linear conveyance process. Specifically, the group 20A of the movable modules 20 travels in a state where the movable modules 20F, 20C, 20R are separated from each other such that a distance between the guide containers 32F, 32R along a center line in the width direction of the circulation path 10 is longer than the length of the packing box CT in the conveyance direction by $2 \times \delta b$ (FIG. 9A, 9B). That is, in the curved conveyance process (M2), the movable module 20F is controlled to travel in front of the movable module 20C by a specified third distance longer than the first distance, so that the guide container 32F regulates a forward position of the packing box CT in the movement direction, while the movable module 20R is controlled to travel behind the movable module 20C by a specified fourth distance longer than the second distance, so that the guide container 32R regulates a rear position of the packing box CT in the movement direction. Here, $\delta b$ may be from 20 mm to 80 mm.

Subsequently, a product filling process is performed (step S4). FIG. 1A, 10B are schematic plan view diagrams to illustrate operation of the conveyance device 1 in the product filling process, and FIG. 11A, 11B are schematic frontal view diagrams.

Figure 10A:
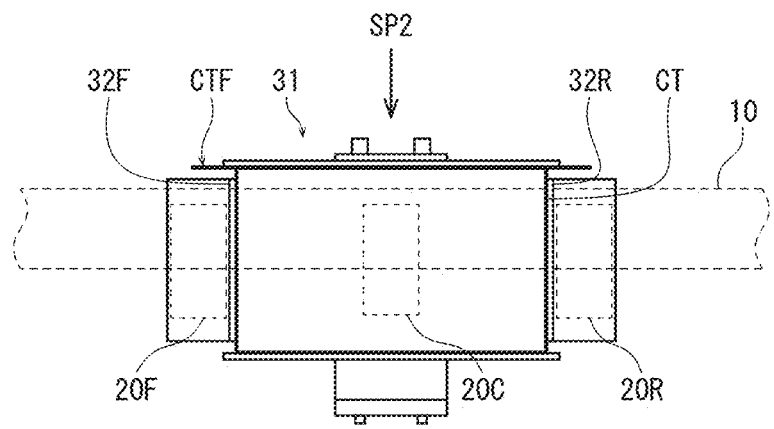
FIG. 10A, 10B are schematic plan views for illustration of operation of a conveyance device 1 in a product filling process.
Figure 10B:
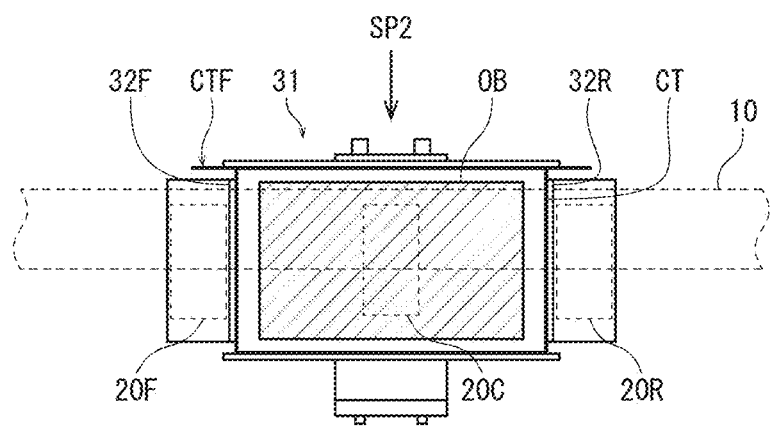
Figure 11A:
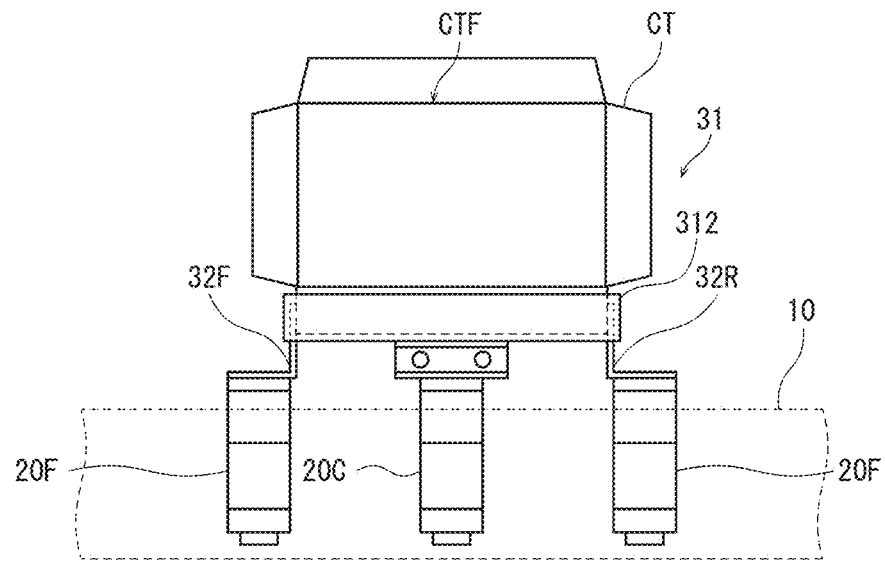
FIG. 11A, 11B are schematic frontal views for illustration of operation of a conveyance device 1 in a product filling process.

In the product filling process, first, the group 20A of the movable modules 20 stops on the circulation path 10 so that a center of the movement direction of the main container 31 is at the position SP2 on the circulation path 10 (FIG. 10A, 11A). At this time, in order to prevent deformation of the packing box CT due to product filling, the group 20A of the movable modules 20 stops in a state where the movable modules 20F, 20C, 20R are close to each other, such that the gap between the guide containers 32F, 32R is equivalent to the length of the packing box CT in the conveyance direction.

Figure 11B:
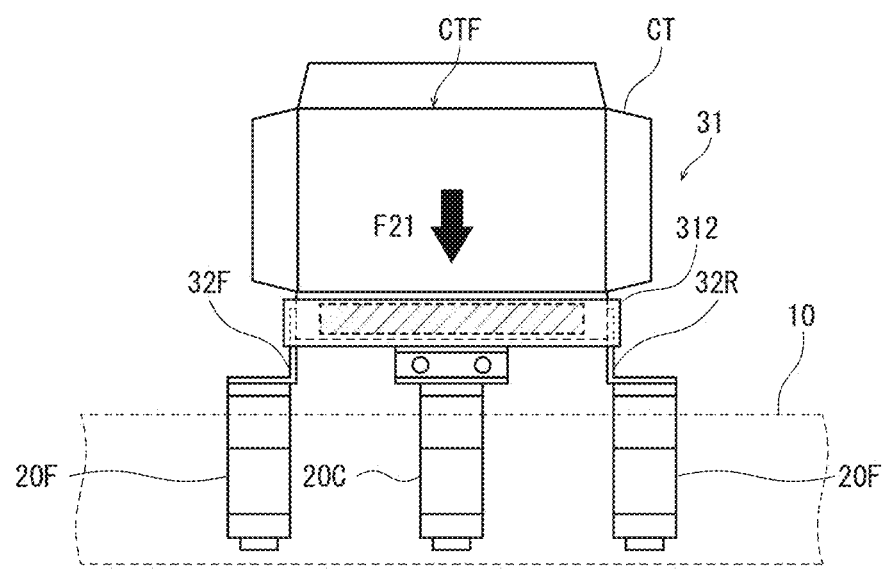

Subsequently, the product filling unit 50 transfers the product OB supplied through the transfer means 52 into the packing box CT (F21) (FIG. 10B, 11B). The packing box CT is mounted on the mounting table 311 of the main container with the lid opened. At this time, deformation of the packing box CT due to product filling is suppressed by the regulation of the guide containers 32F, 32R.

Subsequently, in the linear path portion 10c of the circulation path 10, a linear conveyance process (M3) is performed (step S5). Operation of the conveyance device 1 in the linear conveyance process (M3) is the same as that of step S2.

Figure 12A:
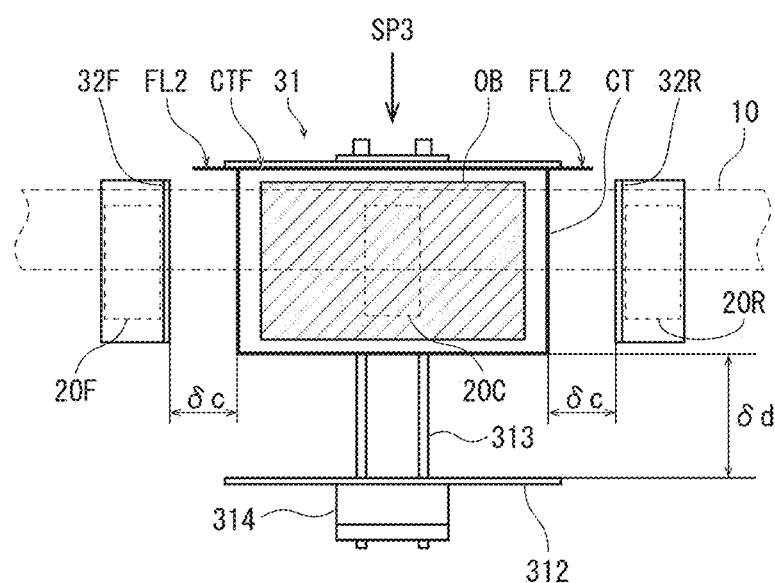
FIG. 12A, 12B, 12C are schematic plan views for illustration of operation of a conveyance device 1 in a sealing process.
Figure 12B:
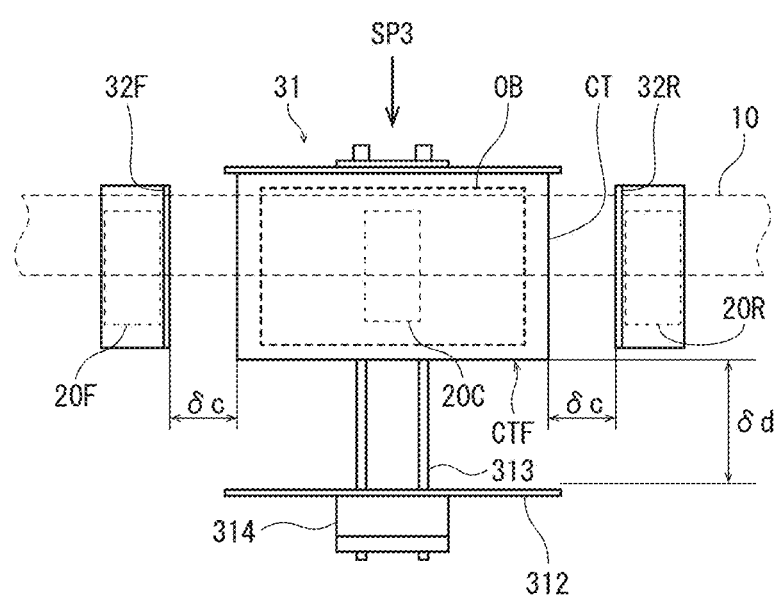
Figure 12C:
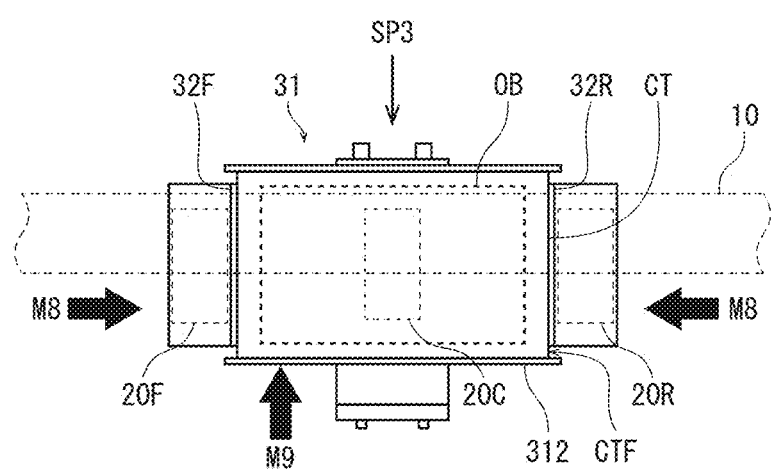

Subsequently, a sealing process is performed (step S6). FIG. 12A, 12B, 12C are schematic plan view diagrams to illustrate operation of the conveyance device 1 in the sealing process, and FIG. 13A, 13B, 13C are schematic frontal view diagrams.

Figure 13A:
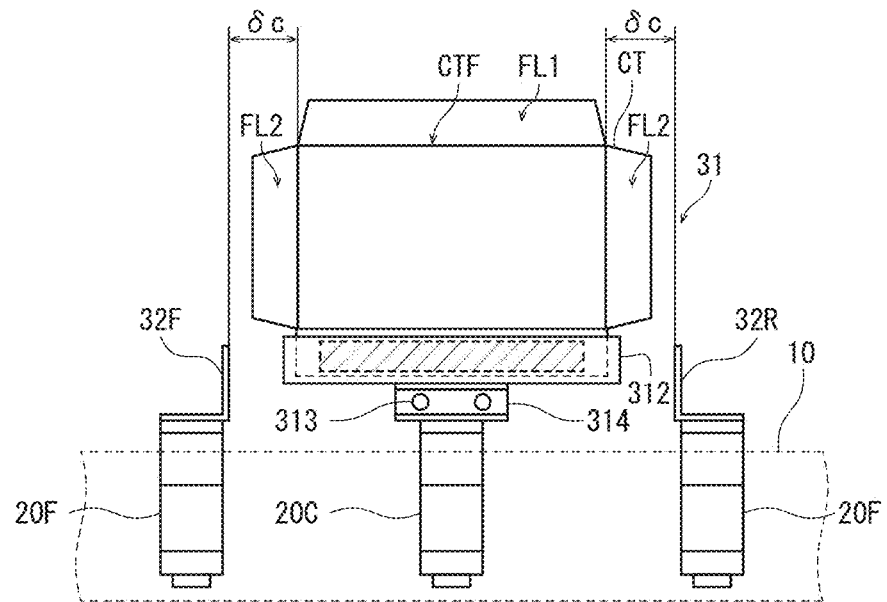
FIG. 13A, 13B, 13C are schematic frontal views for illustration of operation of a conveyance device 1 in a sealing process.
Figure 13B:
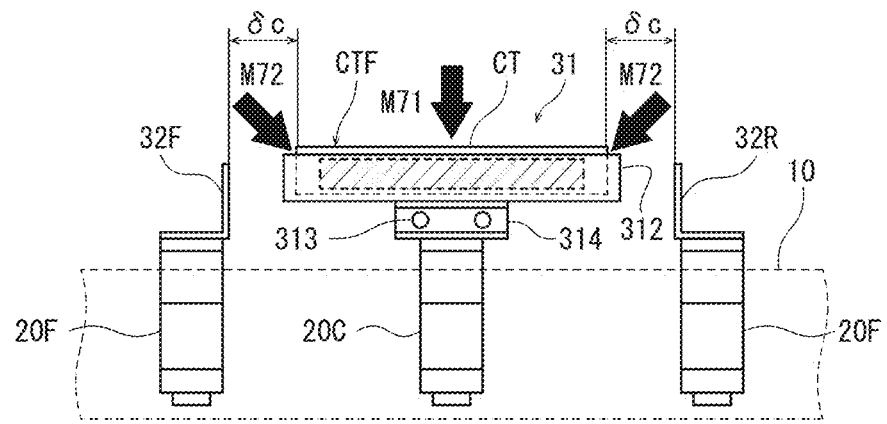
Figure 13C:
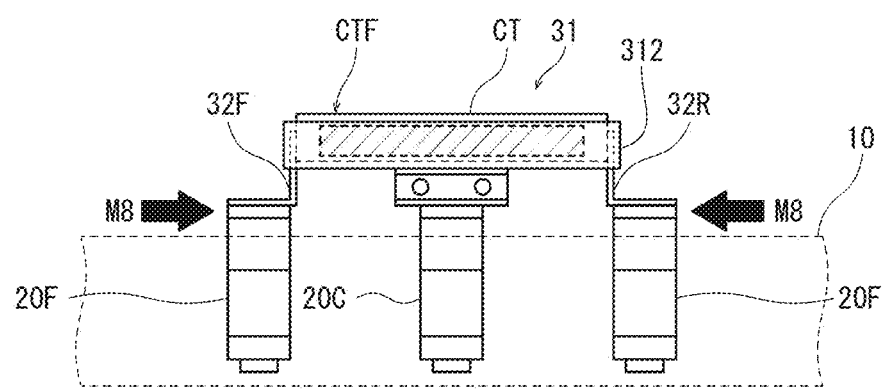

In the sealing process, first the group 20A of the movable modules 20 stops on the circulation path 10 so that a center of the movement direction of the main container 31 is at the position SP3 on the circulation path 10 (FIG. 12A, 13A). At this time, in order to bend the flap FL2 of the lid portion CTF of the packing box CT downward when sealing, each of the moveable modules 20F, 20C, 20R stops at a preset position such that a distance between the guide container 32F and the guide container 32R is set longer than the length of the packing box in the conveyance direction. At this time, the distance between the guide container 32F and the guide container 32R is set to be longer than the length of the packing box CT in the conveyance direction by 2×δc, where δc needs to be larger than the length of the flap FL2 of the lid portion CTF of the packing box CT.

Further, in order to bend the flap FL1 of the lid portion CTF of the packing box CT downward when sealing, the moveable guide portion 312 of the main container 31 is slid by the cam mechanism 314 along the shaft 313 in the direction away from the packing box CT. Here, a distance δd between the movable guide portion 312 and the packing box CT needs to be larger than a length in the Y direction of the flap FL1 of the cover portion CTF of the packing box CT.

Subsequently, the sealing unit 60 bends the lid portion CTF of the packing box CT on the main container 31 at an edge of the opening of the box portion CTB to cover the packing box CT containing the product OB with the lid portion CTF (M71). Subsequently, the flaps FL1 and FL2 of the lid portion CTF of the packing box CT are bent downwards at the bases of the flaps FL1 and FL2, and the flaps FL1 and FL2 are pressed against side surfaces of the packing box CT (M72) (FIG. 12B, 13B). At this time, the guide containers 32F, 32R and the movable guide portion 312 are separated from the packing box CT, and therefore tips of the flaps FL1, FL2 of the lid portion CTF do not come into contact with the guide containers 32F, 32R or the movable guide portion 312, and the flaps FL1, FL2 can be smoothly and easily bent.

The flaps FL1, FL2 are coated with adhesive in the box-making process (step S1), and therefore pressing the flaps FL1, FL2 against the side surfaces of the lid portion CTF achieves preliminary fixing of the lid CTF to the side surfaces of the packing box CT.

Subsequently, the movable modules 20F, 20C, 20R move relative to each other closer to each other until the distance between the guide containers 32F, 32R becomes equivalent to the length of the packing box CT in the conveyance direction (M8). Further, the movable guide portion 312 of the main container 31 is moved along the slide shaft 313 by the cam mechanism 314 until the movable guide portion 312 comes into contact with the packing box CT (M9)(FIG. 12C, 13C).

In this state, the guide containers 32F, 32F press the flaps FU of the lid CTF against the side surfaces of the packing box CT, and the movable guide portion 312 pushes the flap FL1 of the lid CTF against the side surfaces of the packing box CT, thereby pressure fixing the lid portion CTF to the side surfaces of the packing box CT.

Subsequently, in the linear path portion 10c of the circulation path 10, an adhesion process (linear conveyance process (M4)) is performed (step S7). Operation of the conveyance device 1 in the adhesion process (linear conveyance process (M4)) is the same as that of step S2.

Here too, the gap between the guide containers 32F, 32R is maintained to be equivalent to the length of the packing box CT in the conveyance direction, and the group 20A of the movable modules moves in a state where the movable modules 20F, 20C, 20R are close to each other. That is, in the linear conveyance process (M4), similar to the linear conveyance process (M1), the movable module 20F is controlled to move ahead of the movable module 20C by the first distance described above, and the movable module 20R is controlled to move behind the movable module 20C by the second distance described above. Accordingly, the movable guide portion 312 of the main container 31 is kept in contact with the packing box CT and the flaps FL2 of the lid portion CTF are kept pressed against the side surfaces of the packing box CT by the guide containers 32F, 32R. At the same time, the movable guide portion 312 keeps the flap FL1 of the lid portion CTF pressed against the side surfaces of the packing box CT. Accordingly, after the sealing process, the flaps FL1, FL2 of the lid portion CTF are pressure fixed to the side surfaces of the packing box CT while the packing box CT is conveyed (M4) on the linear path portion 10a, making it possible to reduce a waiting time for pressure fixing that is conventionally required.

Figure 14A:
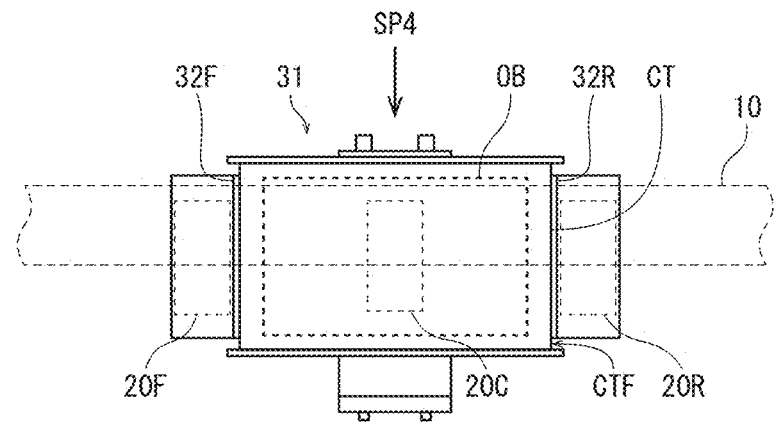
FIG. 14A, 14B, 14C are schematic plan views for illustration of operation of a conveyance device 1 in a transfer process.
Figure 14B:
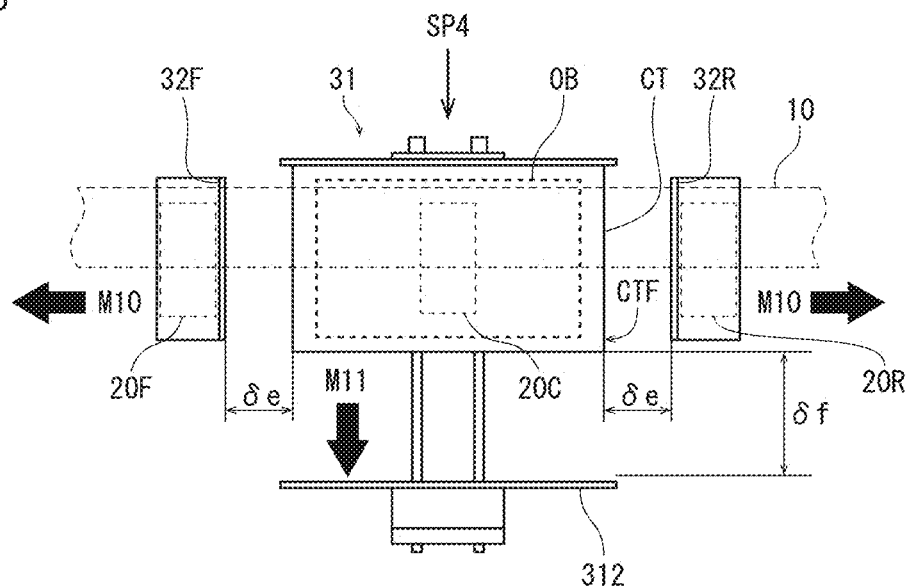
Figure 14C:
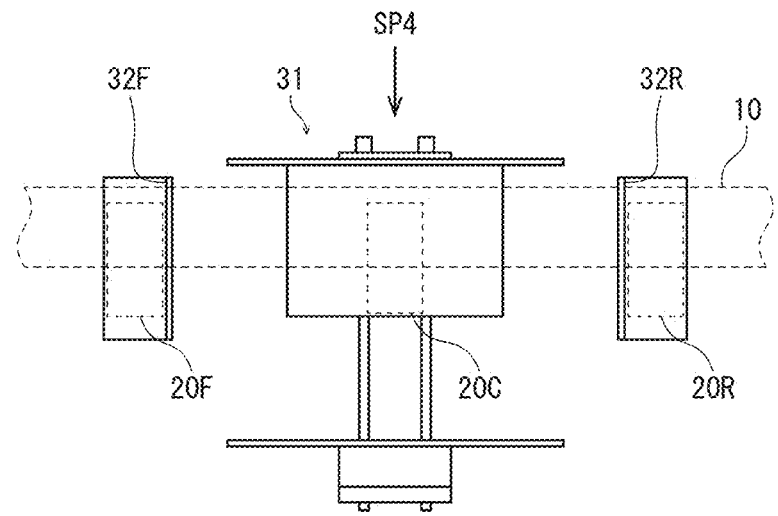

Subsequently, a transfer process is performed (step S8). FIG. 14A, 14B, 14C are schematic plan view diagrams to illustrate operation of the conveyance device 1 in the transfer process, and FIG. 15A, 15B, 15C are schematic frontal view diagrams.

Figure 15A:
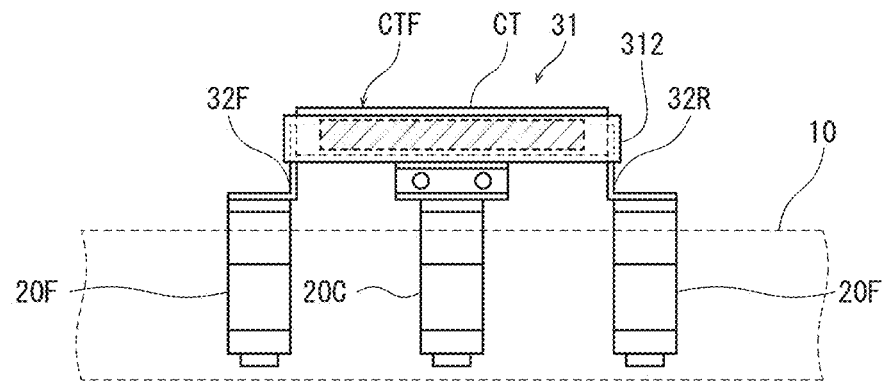
FIG. 15A, 15B, 15C are schematic frontal views for illustration of operation of a conveyance device 1 in a transfer process.

In the transfer process, first, the group 20A of the movable modules 20 stops on the circulation path 10 so that a center of the conveyance direction of the main container 31 containing the product OB is at the position SP4 on the circulation path 10 (FIG. 14A, 15A).

Subsequently, in order to prevent collision between the packing box and the guide containers 32F, 32R when transferring the packing box CT, the movable modules 20F, 20R are moved away from the movable 20C so that the distance between the guide containers 32F, 32R is longer than the length of the packing box CT in the conveyance direction by 2×δe (M10).

Figure 15B:
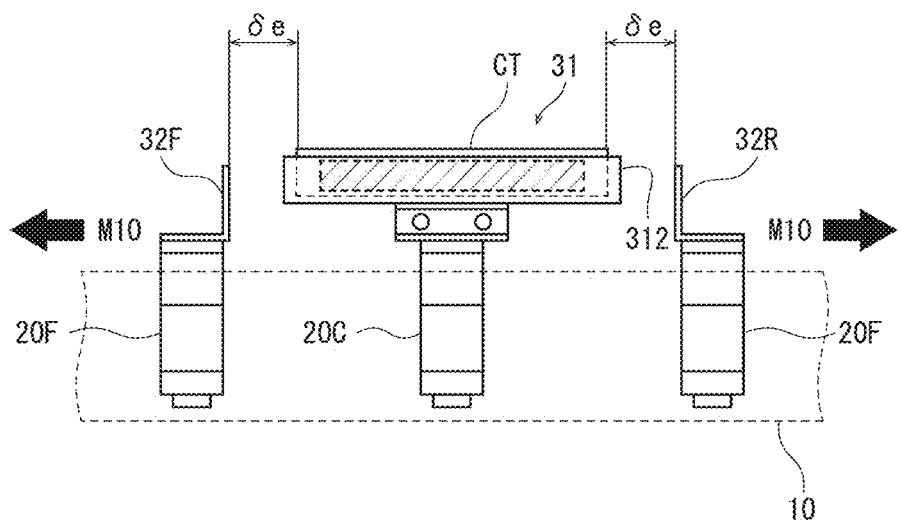
Figure 15C:
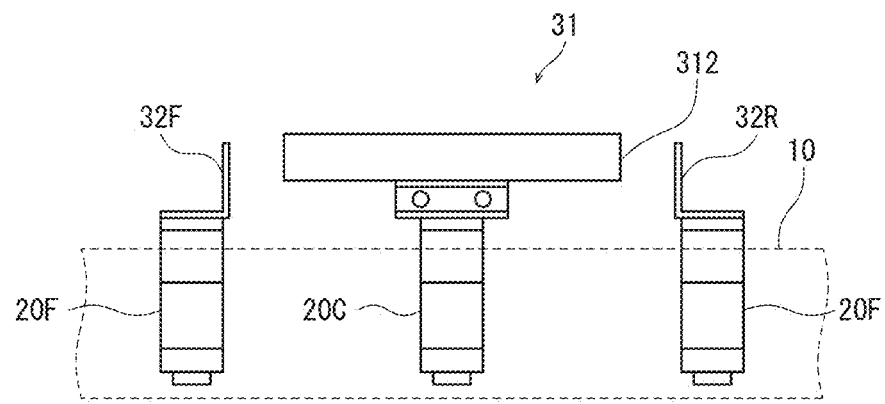

Further, in order to prevent collision between the packing box CT and the movable guide portion 312 of the main container 31, the movable guide portion 312 is moved along the slide shaft 313 by the am mechanism 314 away from the packing box CT by a distance δf (M11) (FIG. 14B, 15B). Here, the distances δe and δf may each be equal to or less than 50 mm.

Subsequently, the transfer unit 70 transfers the packing box CT containing the product OB to the transfer means 72 off the circulation path 10 (FIG. 14C, 15C). The packing box CT placed on the transfer means 72 is conveyed out to post-processing.

Subsequently, in the curved path portion 10d of the circulation path 10, a curved conveyance process (M5) is performed (step S9). Operation of the conveyance device 1 in the curved conveyance process (M5) is the same as that of step S3.

Finally, the group 20A of the movable modules 20 returns to an initial position and stops on the circulation path 10 so that the center of the main container 31 in the movement direction is at the position SP1 on the circulation path 10 (step S10). As in the FIG. 6A, 7A, the movable modules 20F, 20C, 20R each stop at a preset position, such that the distance between the guide containers 32F, 32R is longer than length of the packing box CT in the conveyance direction by 2×δa.

According to the above processing, the conveyance device 1 forms a packing box CT from a supplied packing member CTx conveys the packing box CT along the circulation path 10, fills the packing box CT with the product OB, seals the lid of the packing box CT, and transfers the packing box CT containing the product OB off the circulation path 10.

<Review>

As described above, the conveyance device 1 according to at least one embodiment conveys a packing box CT and includes the circulation path 10 and the movable modules 20 that are movable on the circulation path 10. The main container 31 on which the packing box CT can be placed and the pair of holding members 311, 312 able to move towards and away from each other are provided to at least one of the movable modules 20, and the packing box CT is placed on the main container 31 and conveyed on the circulation path 10 while being held by the pair of holding members 311, 312.

According to this structure, the conveyance device is provided that is able to convey packing boxes CT of different sizes without requiring container format changes due to changes in size of the packing boxes CT to be conveyed, by pressure holding the packing boxes CT.

According to at least one embodiment, the pair of holding members 311, 312 move towards and away from each other in a direction perpendicular to a conveyance direction in which the movable modules 20 move, and further, according to at least one embodiment, the pair of holding members 311, 312 move towards each other by application of pressure from an elastic member. According to this structure, the pair of holding members 311, 312 can press and hold the packing box CT in the direction perpendicular to the conveyance direction of the movable modules 20. As a result, by use of the main container 31 disposed on the movable module 20, it is possible to convey articles of different sizes and reduce work associated with container format changes that accompanies changes in size of articles to be conveyed.

According to at least one embodiment, the packing box CT is semi-finished, when the packing box CT is transferred to the main container 31, the holding members 311, 312 move away from each other, and after the packing box CT is transferred to the main container 31, the holding members 311, 312 move towards each other and hold the packing box CT. According to this structure, a structure is realized by which transfer of the packing box CT to the main container 31 is facilitated and the packing box CT after transfer is held and held under pressure.

According to at least one embodiment, the movable modules 20 include a group of the movable module 20C provided with the main container 31, the movable module 20F positioned before the movable module 20C in a movement direction on the circulation path 10, and the movable module 20R positioned after the movable module 20C in the movement direction, the group moving together on the circulation path 10, the movable module 20F and the movable module 20R are provided with the guide containers 32F, 32R able to hold respective side surfaces of the packing box CT placed on the main container 31, the guide container 32F of the movable module 20F supporting the packing box CT from the front in the movement direction, and the guide container 32R of the movable module 20R supporting the packing box CT from the rear in the movement direction, and the packing box CT is conveyed by the group of the movable modules 20 as a conveyance unit.

According to this structure, in the conveyance device 1, the elements constituting each of the container sets 30, that is, the main container 31 on which the packing box CT is mounted, the guide container 32F supporting the packing box CT from the front, and the guide container 32R supporting the packing box CT from the rear, are mounted on the movable modules 20F, 20C, 20R, respectively, which move as one group along the circulation path 10, to achieve coordinated movement on the circulation path 10.

Accordingly, when an article to be conveyed is changed to an article of a different size, the change in size can easily be handled by, for example, conveyance control to change spacing between the movable modules 20F, 20C, 20R to change spacing between the guide containers 32F, 32R. Thus, it is possible to reduce format change work conventionally required to exchange a plurality of containers on a circulation path for containers suitable for articles of a new size. As a result, pressure holding of the packing boxes CT makes it possible for packing boxes CT of different sizes to be conveyed without requiring container format changes due to changes in size of the packing boxes CT to be conveyed.

Further, weight of the packing box CT is held by the main container 31 and the packing box CT is supported by the guide containers 32F, 32R from the front and rear in the movement direction, and therefore an article can be conveyed on a curved route, which is difficult for a structure that holds an article with two movable elements, as conventionally.

According to at least one embodiment, when the movable module 20F moves on a curve on the circulation path 10, a distance between the movable module 20F and the movable module 20C is greater than that when moving in a straight line on the circulation path 10, and when the movable module 20R moves on a curve on the circulation path 10, a distance between the movable module 20R and the movable module 20C is greater than that when moving in a straight line on the circulation path 10.

According to this structure, when moving along the curved path portion 10b of the circulation path 10, distance between the guide containers 32F, 32R is increased in advance compared to that during linear conveyance, such that collision between the guide containers 32F, 32R and the packing box CT caused by front-to-rear spacing narrowing in the radially inner direction of the curved path portion 10b is avoided.

According to at least one embodiment, the packing box CT has the box portion CTB and the lid portion CTF extending from an open edge of the box portion CTB, the conveyance device 1 further comprises the sealing device 61 that, when the packing box CT has been filled with a product and conveyed on the circulation path 10, seals the packing box CT by closing the lid CTF of the packing box CT, bending the flaps FL2 of the lid portion CTF, and adhering the box portion CTB to the flaps FL2 of the lid portion CTF, and after the sealing, while the movable module 20C is moving in a straight line on the circulation path 10, the guide containers 32F, 32R provided to the movable module 20F and the movable module 20R press against front and rear flaps FL2 of the lid portion CIF of the packing box CT from the front and rear, respectively, and conduct pressure-fixing, fixing the flaps FL2 to the box portion CTB.

According to this structure, after the sealing process, the flaps FL2 of the lid portion CTF may be pressure-fixed to side surfaces of the packing box CT while the packing box CT is linearly conveyed (M4) on the linear path portion 10c, while reduces a waiting time conventionally required for pressure-fixing after sealing.

According to at least one embodiment, the packing box CT has the box portion CTB and the conveyance device 1 further comprises a box-making device 41 that applies adhesive to the adhesive portions of the sheet-like packing member CTx, forms the box portion CTB by bending portions of the sheet-like packing member CTx that are to be ridge lines, and makes the packing box CT by adhering the adhesive portions of the box portion CTB. After the box-making, while the movable module 20C is moving in a straight line, the guide containers 32F, 32R provided to the movable module 20F and the movable module 20R press against front and rear of the box portion CTB of the packing box CT from the front and rear, respectively, and conduct pressure-fixing, fixing the adhesive portions of the box portion CTB.

According to this structure, after the box-making process, adhesive portions of the box portion CTB perpendicular to the longitudinal direction of the box portion CTB are pressure-fixed while the packing box CT is linearly conveyed (M1) on the linear path portion 10a, which reduces a waiting time conventionally required for pressure-fixing after box-making.

MODIFICATIONS

Although the conveyance device according to an embodiment has been described, the present disclosure is not limited to the embodiments above, aside from essential characterizing elements. For example, an embodiment realized by applying various modifications that a person skilled in the art could conceive of to an embodiment described above, and an embodiment realized by any combination of constituent elements or functions of embodiments described above are also included in this disclosure, as long as they do not depart from the scope of the present disclosure. The following describes a modification example of the conveyance device as one such example.

According to an embodiment described above, a configuration of the conveyance device 1 is described assuming that sizes of articles supplied are the same, and the movable modules 20F, 20C, 20R on which the container set 30 is mounted maintain relative distances adapted to the size of the articles supplied and move as one group along the circulation path 10. However, when there are multiple sizes of articles to be supplied, the conveyance device 1 may be configured such that distances between the movable modules 20F, 20C, 20R are set in steps according to article size. According to such a configuration, even when articles of different sizes are supplied sequentially, articles can be conveyed by adjusting distances between the movable modules 20 as appropriate for each article, and therefore it is possible for a variety of mixed articles to be conveyed.

SUPPLEMENT

The embodiments described above are preferred specific examples of the present invention. Numerical values, shapes, materials, constituent elements, arrangements, positions, and connections of constituent elements, processes, order of processes, and the like described above are illustrative examples of embodiments, and are not intended to limit the present invention. Further, among constituent elements of embodiments, those that are not described in independent claims, which represent the highest-level concepts of the present invention, are described as constituent elements constituting preferred embodiments.

Further, the order of processing described above is for illustrative purposes in description of specific embodiments of the present invention, and alternative orders may be used. Further, some processes may be performed concurrently (in parallel) with others.

In order to facilitate understanding of the invention, constituent elements in the drawings used in description of the embodiments are not necessarily drawn to scale. Further, the present invention is not limited to the description of the above embodiments, and may be modified as appropriate without departing from the scope of the present invention.

Further, at least a portion of the functions of each embodiment and modification thereof may be combined.

INDUSTRIAL APPLICABILITY

The conveyance device according to an aspect of the present disclosure may be used as a conveyance device that conveys articles such as products, parts, manufactured articles, packages, various containers, and the like, along a manufacturing line or the like. Further, the conveyance device can be adapted for use as a conveyance device that conveys packaged luggage and packages in various types of physical distribution.

REFERENCE SIGNS LIST

1 Conveyance device
15 Linear conveyance means
10 Circulation path (stators)
11 Guide rail
12 Electromagnetic coil
13 Linear encoder
20 Movable modules (movable elements)
20C Movable module (movable element)
20F, 20R Movable modules (movable elements)
21 Container holding portion
22 Base portion
23 Rollers
24 Permanent magnets
30 Container set
31 Main container
311 Mounting table
312 Movable guide portion
313 Slide shaft
314 Cam mechanism
315 Mounting table stay
32F Guide container
32R Guide container
40 Box-making unit
41 Box-making device
42 Transfer means
50 Product filling unit
51 Product filling device
52 Product transfer conveyor
60 Sealing unit
61 Sealing device
70 Transfer unit
71 Transfer device
72 Output conveyor
80 Controller
OB Product
CT Packing box

The invention claimed is:

1. A conveyance device that conveys articles, the conveyance device comprising:
a circulation path; and
movable modules that are movable on the circulation path, wherein
the movable modules include a group of a first movable module provided with a main container, a second movable module positioned before the first movable module in a movement direction on the circulation path, and a third movable module positioned after the first movable module in the movement direction, the group movable together on the circulation path, the second movable module and the third movable module are each provided with a guide container able to hold a respective side of an article placed on the main container, the guide container of the second movable module supporting the article from the front in the movement direction, and the guide container of the third movable module supporting the article from the rear in the movement direction, the article is conveyable by the group of the movable modules as a conveyance unit, the article is a packing box having a box portion and a lid portion extending from an open edge of the box portion, the conveyance device further comprises a sealer that when the packing box has been filled with a product and conveyed on the circulation path, seals the packing box by closing the lid portion of the packing box, bending flaps of the lid portion, and adhering the box portion to the flaps of the lid portion, and after the sealing, while the first movable module is moving in a straight line on the circulation path, the guide containers provided to the second movable module and the third movable module press against front and rear flaps of the lid portion of the packing box from the front and rear, respectively, and conduct pressure-fixing, fixing the flaps to the box portion.

2. A conveyance device that conveys articles, the conveyance device comprising:

a circulation path; and movable modules that are movable on the circulation path, wherein the movable modules include a group of a first movable module provided with a main container, a second movable module positioned before the first movable module in a movement direction on the circulation path and a third movable module positioned after the first movable module in the movement direction, the group movable together on the circulation path, the second movable module and the third movable module are each provided with a guide container able to hold a respective side of an article placed on the main container, the guide container of the second movable module supporting the article from the front in the movement direction, and the guide container of the third movable module supporting the article from the rear in the movement direction, the article is conveyable by the group of the movable modules as a conveyance unit, when the second movable module moves on a first curve on the circulation path, a first distance between the second movable module and the first movable module is greater than that when moving in a first straight line on the circulation path, and when the third movable module moves on a second curve on the circulation path, a second distance between the third movable module and the first movable module is greater than that when moving in a second straight line on the circulation path.

3. The conveyance device of claim 1, wherein the packing box is semi-finished, and the conveyance device further comprises a box maker that forms the semi-finished packing box by bending portions of a packing member in the form of a sheet that are to be ridge lines, and transfers the semi-finished packing box onto the main container.

4. The conveyance device of claim 2, wherein the article is a packing box that is semi-finished, and the conveyance device further comprises a box maker that forms the semi-finished packing box by bending portions of a packing member in the form of a sheet that are to be ridge lines, and transfers the semi-finished packing box onto the main container.

* * * * *